United States Patent
Gajiwala et al.

(10) Patent No.: US 10,404,105 B2
(45) Date of Patent: Sep. 3, 2019

(54) POWER STORAGE ADAPTER FOR WIRELESS POWER TRANSMISSION

(71) Applicant: Dell Products L.P., Round Rock, TX (US)

(72) Inventors: Priyank Jatin Gajiwala, Austin, TX (US); Andrew Thomas Sultenfuss, Leander, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 15/704,808

(22) Filed: Sep. 14, 2017

(65) Prior Publication Data

US 2019/0081515 A1 Mar. 14, 2019

(51) Int. Cl.

| | |
|---|---|
| H02J 7/00 | (2006.01) |
| H02J 50/40 | (2016.01) |
| H02J 50/12 | (2016.01) |
| H02J 7/02 | (2016.01) |
| H02J 50/90 | (2016.01) |
| H01F 38/14 | (2006.01) |
| H01F 27/28 | (2006.01) |
| H01F 27/36 | (2006.01) |
| H02J 50/80 | (2016.01) |
| H02J 50/70 | (2016.01) |

(52) U.S. Cl.
CPC .......... *H02J 50/40* (2016.02); *H01F 27/2885* (2013.01); *H01F 27/365* (2013.01); *H01F 38/14* (2013.01); *H02J 7/0027* (2013.01); *H02J 7/025* (2013.01); *H02J 50/12* (2016.02); *H02J 50/70* (2016.02); *H02J 50/80* (2016.02); *H02J 50/90* (2016.02)

(58) Field of Classification Search
CPC ............. H02J 50/40; H02J 50/70; H02J 50/80
USPC .......................................... 320/108; 307/104
See application file for complete search history.

(56) References Cited

U.S. PATENT DOCUMENTS

| | | | |
|---|---|---|---|
| 4,672,228 | A | 6/1987 | Swoboda |
| 5,598,327 | A | 1/1997 | Somerville et al. |
| 5,811,895 | A | 9/1998 | Suzuki et al. |
| 6,057,609 | A | 5/2000 | Nagai et al. |
| 6,293,700 | B1 | 9/2001 | Lund et al. |
| 6,477,054 | B1 | 11/2002 | Hagerup |
| 7,127,228 | B2 | 10/2006 | Chang et al. |

(Continued)

OTHER PUBLICATIONS

Universal Serial Bus, "USB Power Delivery." Retrieved from <http://www.usb.org/developers/powerdelivery/> on Jun. 28, 2017; 3 pages.

(Continued)

*Primary Examiner* — Zixuan Zhou

(74) *Attorney, Agent, or Firm* — Baker Botts L.L.P.

(57) ABSTRACT

A power storage adapter may include wireless power units for wireless power transmission of multiple portable information handling systems. In particular, when a wireless power unit wirelessly transmits a first wireless power to one of the portable information handling systems, another wireless power unit may wirelessly transmit a second wireless power to another portable information handling system. The transmission of the first wireless power may be simultaneous with the transmission of the second wireless power.

18 Claims, 10 Drawing Sheets

(56) References Cited

U.S. PATENT DOCUMENTS

| | | |
|---|---|---|
| 7,243,246 B2 | 7/2007 | Allen et al. |
| 7,536,569 B2 | 5/2009 | Montero et al. |
| 7,538,518 B2 | 5/2009 | Wang et al. |
| 7,545,120 B2 | 6/2009 | Breen et al. |
| 7,592,716 B2 | 9/2009 | Zhu et al. |
| 7,989,981 B2 | 8/2011 | Zhang |
| 8,164,904 B2 | 4/2012 | Matz et al. |
| 8,188,594 B2 | 5/2012 | Ganesan et al. |
| 9,166,083 B2 | 10/2015 | Meinel et al. |
| 9,197,092 B2 | 11/2015 | Verdun et al. |
| 9,263,912 B2 | 2/2016 | Verdun et al. |
| 9,300,015 B2 | 3/2016 | Chang et al. |
| 9,524,018 B2 | 12/2016 | Sultenfuss et al. |
| 9,568,990 B2 | 2/2017 | Chueh et al. |
| 9,681,558 B2 | 6/2017 | Chen et al. |
| 9,693,446 B2 | 6/2017 | Ragg |
| 9,812,878 B1 | 11/2017 | Stieber et al. |
| 9,867,275 B2 | 1/2018 | Chen |
| 9,887,571 B1 | 2/2018 | Sultenfuss et al. |
| 10,128,764 B1 | 11/2018 | Vinciarelli |
| 2003/0085626 A1 | 5/2003 | Odaohhara |
| 2003/0212923 A1 | 11/2003 | Coppock et al. |
| 2004/0075418 A1 | 4/2004 | Densham et al. |
| 2004/0125618 A1 | 7/2004 | Rooij et al. |
| 2004/0135565 A1 | 7/2004 | Douma et al. |
| 2005/0052164 A1 | 3/2005 | Sakai et al. |
| 2005/0125709 A1 | 6/2005 | McKim |
| 2005/0174094 A1 | 8/2005 | Purdy et al. |
| 2005/0275383 A1 | 12/2005 | Ishishita |
| 2006/0022637 A1 | 2/2006 | Wang et al. |
| 2006/0164038 A1 | 7/2006 | Demers et al. |
| 2007/0079153 A1 | 4/2007 | Bain |
| 2007/0103110 A1* | 5/2007 | Sagoo ............... H02J 7/025 320/109 |
| 2007/0200433 A1 | 8/2007 | Kelty |
| 2007/0248877 A1 | 10/2007 | Qahoug |
| 2007/0279004 A1 | 12/2007 | Wang et al. |
| 2008/0315826 A1 | 12/2008 | Alberth, Jr. et al. |
| 2009/0001937 A1 | 1/2009 | Densham et al. |
| 2009/0076661 A1 | 3/2009 | Pearson et al. |
| 2009/0146826 A1 | 6/2009 | Gofman et al. |
| 2009/0244944 A1 | 10/2009 | Jang et al. |
| 2010/0038963 A1 | 2/2010 | Shetty et al. |
| 2010/0067197 A1 | 3/2010 | Guccione et al. |
| 2011/0068626 A1 | 3/2011 | Terlizzi et al. |
| 2011/0225073 A1 | 9/2011 | Won et al. |
| 2011/0227407 A1 | 9/2011 | Ransom |
| 2011/0260681 A1* | 10/2011 | Guccione ............. H02J 7/0054 320/108 |
| 2012/0025630 A1 | 2/2012 | Tsuda |
| 2012/0084575 A1 | 4/2012 | Flores et al. |
| 2012/0091815 A1 | 4/2012 | Richards, III |
| 2012/0123604 A1 | 5/2012 | Littrell |
| 2012/0151240 A1 | 6/2012 | Robinson et al. |
| 2012/0181990 A1 | 7/2012 | Asakura et al. |
| 2012/0201062 A1 | 8/2012 | Lee |
| 2012/0256484 A1 | 10/2012 | Kemp |
| 2012/0316695 A1 | 12/2012 | Chen |
| 2012/0319656 A1 | 12/2012 | Toma |
| 2013/0043827 A1 | 2/2013 | Weinstein et al. |
| 2013/0100568 A1 | 4/2013 | Mistry et al. |
| 2013/0314039 A1 | 11/2013 | Weber et al. |
| 2013/0342011 A1 | 12/2013 | Robinson et al. |
| 2014/0018969 A1 | 1/2014 | Forbes |
| 2014/0035380 A1 | 2/2014 | Stevens et al. |
| 2014/0157065 A1 | 6/2014 | Ong |
| 2014/0210267 A1 | 7/2014 | Ishida et al. |
| 2014/0214223 A1 | 7/2014 | Tsunoda et al. |
| 2014/0217958 A1 | 8/2014 | Verdun et al. |
| 2014/0239882 A1 | 8/2014 | Yang |
| 2015/0063473 A1 | 3/2015 | Nishibayashi |
| 2015/0132615 A1 | 5/2015 | Yun |
| 2015/0165917 A1 | 6/2015 | Robers et al. |
| 2015/0364921 A1 | 12/2015 | Tatsuta et al. |
| 2016/0099608 A1 | 4/2016 | Jao et al. |
| 2016/0241148 A1 | 8/2016 | Kizilyalli et al. |
| 2016/0246316 A1 | 8/2016 | Lim et al. |
| 2016/0274607 A1 | 9/2016 | Kudo |
| 2016/0329612 A1 | 11/2016 | Jung |
| 2016/0359426 A1 | 12/2016 | Jitaru et al. |
| 2017/0040815 A1 | 2/2017 | Todasco |
| 2017/0077738 A1* | 3/2017 | Park .................. H02J 7/025 |
| 2017/0085098 A1 | 3/2017 | Sporck et al. |
| 2017/0104330 A1 | 4/2017 | Nakaishi |
| 2017/0177069 A1 | 6/2017 | Bedare et al. |
| 2017/0225586 A1 | 8/2017 | Zhang et al. |
| 2018/0181171 A1 | 6/2018 | Jang et al. |
| 2018/0233914 A1 | 8/2018 | Miki et al. |
| 2018/0351399 A1 | 12/2018 | Frey |
| 2018/0375358 A1 | 12/2018 | Sultenfuss et al. |
| 2018/0375359 A1 | 12/2018 | Sultenfuss et al. |
| 2018/0375360 A1 | 12/2018 | Sultenfuss et al. |
| 2018/0375361 A1 | 12/2018 | Sultenfuss et al. |
| 2019/0050037 A1 | 2/2019 | Wang et al. |

OTHER PUBLICATIONS

SMBus, "System Management Bus (SMBus)." Retrieved from <www.smbus.org> on Jun. 28, 2017; 2 pages.

UEFI, "Unified Extensible Firmware Interface (UEFI) Specification", Retrieved from <http://uefi.org> May 2017; 2899 pages.

Wikipedia, "USB." Retrieved from <https://en.wikipedia.org/wiki/USB> on Mar. 19, 2017; 35 pages.

Notice of Allowance and Fee(s) Due for U.S. Appl. No. 15/631,467, filed Jun. 23, 2017, dated Sep. 29, 2017; 13 pages.

Waffenschmidt, Eberhard. "Qi Coupling Factor." Qi Coupling Factor, www.wirelesspowerconsortium.com/technology/coupling-factor.html, Retrieved Jan. 3, 2018; 5 pages.

Waffenschmidt, Eberhard. "Resonant Coupling." Resonant Coupling, https://www.wirelesspowerconsortium.com/technology/resonant-coupling.html; Retrieved Jan. 3, 2018; 4 pages.

Wow! A true free-positioning 5-phone charger—Wireless Power Consortium Blog. Wireless Power Consortium. Web. <http://www.wirelesspowerconsortium.com/blog/67/wow-a-true-free-positioning-5-phone-charger>; Retrieved Jan. 3, 2018; 6 pages.

Received STIC search report from EIC 2800 searcher John DiGeronimo dated Dec. 7, 2017; 31 pages.

Received STIC search report from EIC 2800 searcher Benjamin Martin dated Sep. 28, 2017; 14 pages.

* cited by examiner

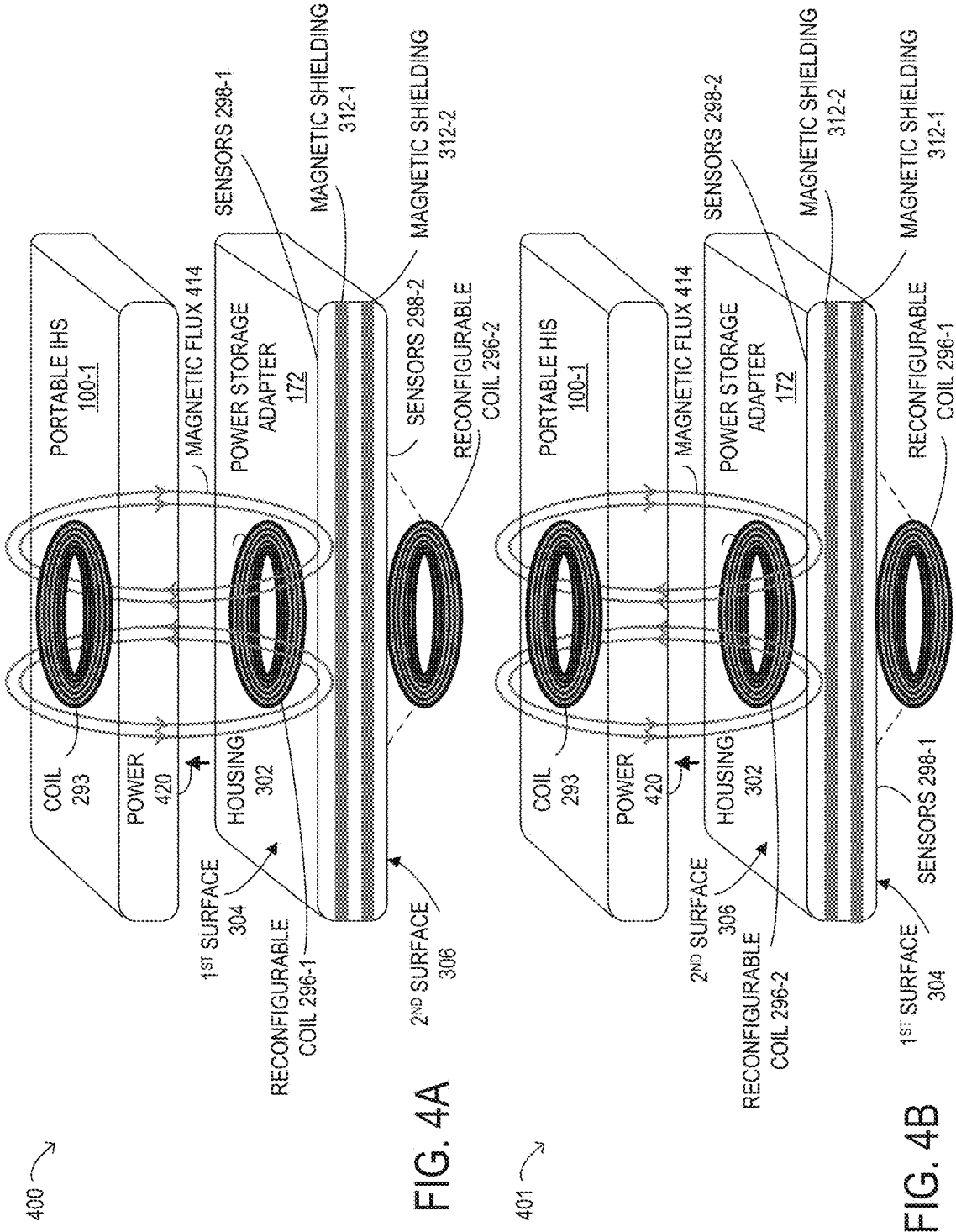

POWER STORAGE ADAPTER FOR WIRELESS POWER TRANSMISSION

BACKGROUND

Field of the Disclosure

This disclosure relates generally to information handling systems and, more particularly, to a power storage adapter for wireless power transmission of multiple portable information handling systems.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed power storage adapter (PSA) may include a housing that may include a first surface and a second surface opposite the first surface, a PSA port, a PSA battery, a first wireless power unit that may include a first transmitter, a first receiver, a first coil in proximity to the first surface, and a first proximity sensor, a second wireless power unit that may include a second transmitter, a second receiver, a second coil in proximity to the second surface, and a second proximity sensor, and a communication device. The power storage adapter may also include a PSA controller having access to memory media storing instructions executable by the PSA controller that may detect a first electronic device having a third coil at one of the first surface and the second surface using the first proximity sensor and the second proximity sensor, and determine, using the communication device, whether the first electronic device may be enabled to receive or transmit wireless power. The instructions may also, when the first electronic device may be enabled to transmit the wireless power, receive a first wireless power from the third coil at one of the first surface and the second surface based on the first proximity sensor and the second proximity sensor, and when the first electronic device may be enabled to receive the wireless power, transmit the first wireless power to the third coil at one of the first surface and the second surface based on the first proximity sensor and the second proximity sensor.

In any of the disclosed embodiments of the power storage adapter, may further include instructions that may, when the first electronic device may be detected at the first surface: when the first electronic device may be enabled to transmit the wireless power, configure the first coil as a receive coil, and when the first electronic device may be enabled to receive the wireless power, configure the first coil as a transmit coil.

In any of the disclosed embodiments of the power storage adapter, may further include instructions that may, when the first electronic device is detected at the second surface: when the first electronic device may be enabled to transmit the wireless power, configure the second coil as a receive coil, and when the first electronic device may be enabled to receive the wireless power, configure the second coil as a transmit coil.

In any of the disclosed embodiments of the power storage adapter, may further include instructions that may detect a second electronic device having a fourth coil at one of the first surface and the second surface using the first proximity sensor and the second proximity sensor. The second electronic device and the first electronic device may be detected at different surfaces. The power storage adapter may also include instructions that may determine, using the communication device, whether the second electronic device may be enabled to receive or transmit wireless power, when the second electronic device may be enabled to transmit the wireless power, receive a second wireless power from the fourth coil at one of the first surface and the second surface based on the first proximity sensor and the second proximity sensor, and when the second electronic device may be enabled to receive the wireless power, transmit the second wireless power to the fourth coil at one of the first surface and the second surface based on the first proximity sensor and the second proximity sensor. Receiving or transmitting the second wireless power may be simultaneous with receiving or transmitting the first wireless power.

In any of the disclosed embodiments of the power storage adapter, may further include instructions that may receive a request for a third power delivery contract from a third electronic device coupled to the power storage adapter at the PSA port, the third power delivery contract may supply a third electrical power to the third electronic device, and responsive to receiving the request, establish the third power delivery contract. Supplying the third wireless power may be simultaneous with receiving or transmitting the first wireless power.

In any of the disclosed embodiments of the power storage adapter, may further include instructions that may, when the first electronic device may be enabled to receive the wireless power, supply the first wireless power from the PSA battery.

In any of the disclosed embodiments of the power storage adapter, may further include instructions that may, when the first electronic device may be enabled to receive the wireless power, supply the first wireless power from an AC line power source coupled to the power storage adapter using an AC-DC converter.

In any of the disclosed embodiments of the power storage adapter, may further include instructions that may, when the first electronic device may be enabled to transmit the wireless power, charge the PSA battery using the first wireless power.

In any of the disclosed embodiments of the power storage adapter, the first electronic device may be a portable information handling system and the second electronic device may be one of a charging device and a portable information handling system.

In any of the disclosed embodiments of the power storage adapter, the power storage adapter may further include a first magnetic shield that may divert a first magnetic flux of the first coil away from the second coil and ma generate a first opposing magnetic flux to remove effects of the first magnetic flux on the second coil. The power storage adapter may also include a second magnetic shield that may divert a second magnetic flux of the second coil away from the first coil and may generate a second opposing magnetic flux to remove effects of the second magnetic flux on the first coil.

In a further aspect, a disclosed method may include detecting a first electronic device having a third coil at one of a first surface and a second surface of a housing of a power storage adapter using a first proximity sensor and a second proximity sensor of the power storage adapter. The second surface may be opposite the first surface. The method may also include determining, using a communication device of the power storage adapter, whether the first electronic device may be enabled to receive or transmit wireless power. The method may further include, when the first electronic device may be enabled to transmit the wireless power, receiving the wireless power from the third coil at one of the first surface and the second surface based on the first proximity sensor and the second proximity sensor. The method may also include, when the first electronic device may be enabled to receive the wireless power, transmitting a first wireless power to the third coil at one of the first surface and the second surface based on the first proximity sensor and the second proximity sensor.

In any of the disclosed embodiments of the method, the method may also include, when the first electronic device may be detected at the first surface: when the first electronic device may be enabled to transmit the wireless power, configuring the first coil as a receive coil, and when the first electronic device may be enabled to receive the wireless power, configuring the first coil as a transmit coil.

In any of the disclosed embodiments of the method, the method may also include, when the first electronic device may be detected at the second surface: when the first electronic device may be enabled to transmit the wireless power, configuring the second coil as a receive coil, and when the first electronic device may be enabled to receive the wireless power, configuring the second coil as a transmit coil.

In any of the disclosed embodiments of the method, the method may also include detecting a second electronic device having a fourth coil at one of the first surface and the second surface using the first proximity sensor and the second proximity sensor. The second electronic device and the first electronic device may be detected at different surfaces. The method may also include determining, using the communication device, whether the second electronic device may be enabled to receive or transmit wireless power. The method may further include, when the second electronic device may be enabled to transmit the wireless power, receiving a second wireless power from the fourth coil at one of the first surface and the second surface based on the first proximity sensor and the second proximity sensor, and when the second electronic device may be enabled to receive the wireless power, transmitting the second wireless power to the fourth coil at one of the first surface and the second surface based on the first proximity sensor and the second proximity sensor. Receiving or transmitting the second wireless power may be simultaneous with receiving or transmitting the first wireless power.

In any of the disclosed embodiments of the method, the method may also include receiving a request for a third power delivery contract from a third electronic device coupled to the power storage adapter at the PSA port, the third power delivery contract may supply a third electrical power to the third electronic device, and responsive to receiving the request, establishing the third power delivery contract. Supplying the third wireless power may be simultaneous with receiving or transmitting the first wireless power.

In any of the disclosed embodiments of the method, the method may also include, when the first electronic device may be enabled to receive the wireless power, supplying the first wireless power from the PSA battery.

In any of the disclosed embodiments of the method, the method may also include, when the first electronic device may be enabled to receive the wireless power, supplying the first wireless power from an AC line power source coupled to the power storage adapter using an AC-DC converter.

In any of the disclosed embodiments of the method, the method may also include, when the first electronic device may be enabled to transmit the wireless power, charging the PSA battery using the first wireless power.

In any of the disclosed embodiments of the method, the first electronic device may be a portable information handling system and the second electronic device may be one of a charging device and a portable information handling system.

In any of the disclosed embodiments of the method, the method may also include diverting, by a first magnetic shield of the power storage adapter, a first magnetic flux of the first coil away from the second coil, and generating, by the first magnetic shield of the power storage adapter, a first opposing magnetic flux to remove effects of the first magnetic flux on the second coil. The method may further include diverting, by a second magnetic shield of the power storage adapter, a second magnetic flux of the second coil away from the first coil, and generating, by the second magnetic shield of the power storage adapter, a second opposing magnetic flux to remove effects of the second magnetic flux on the first coil.

BRIEF DESCRIPTION OF THE DRAWINGS

For a more complete understanding of the present disclosure and its features and advantages, reference is now made to the following description, taken in conjunction with the accompanying drawings, in which:

FIGS. 4A, 4B, 4C, 4D, 4E, and 4F are block diagrams of selected elements of embodiments of a power storage adapter for wireless power transmission with portable information handling systems and a charging device;

DESCRIPTION OF PARTICULAR EMBODIMENT(S)

Figure 1:
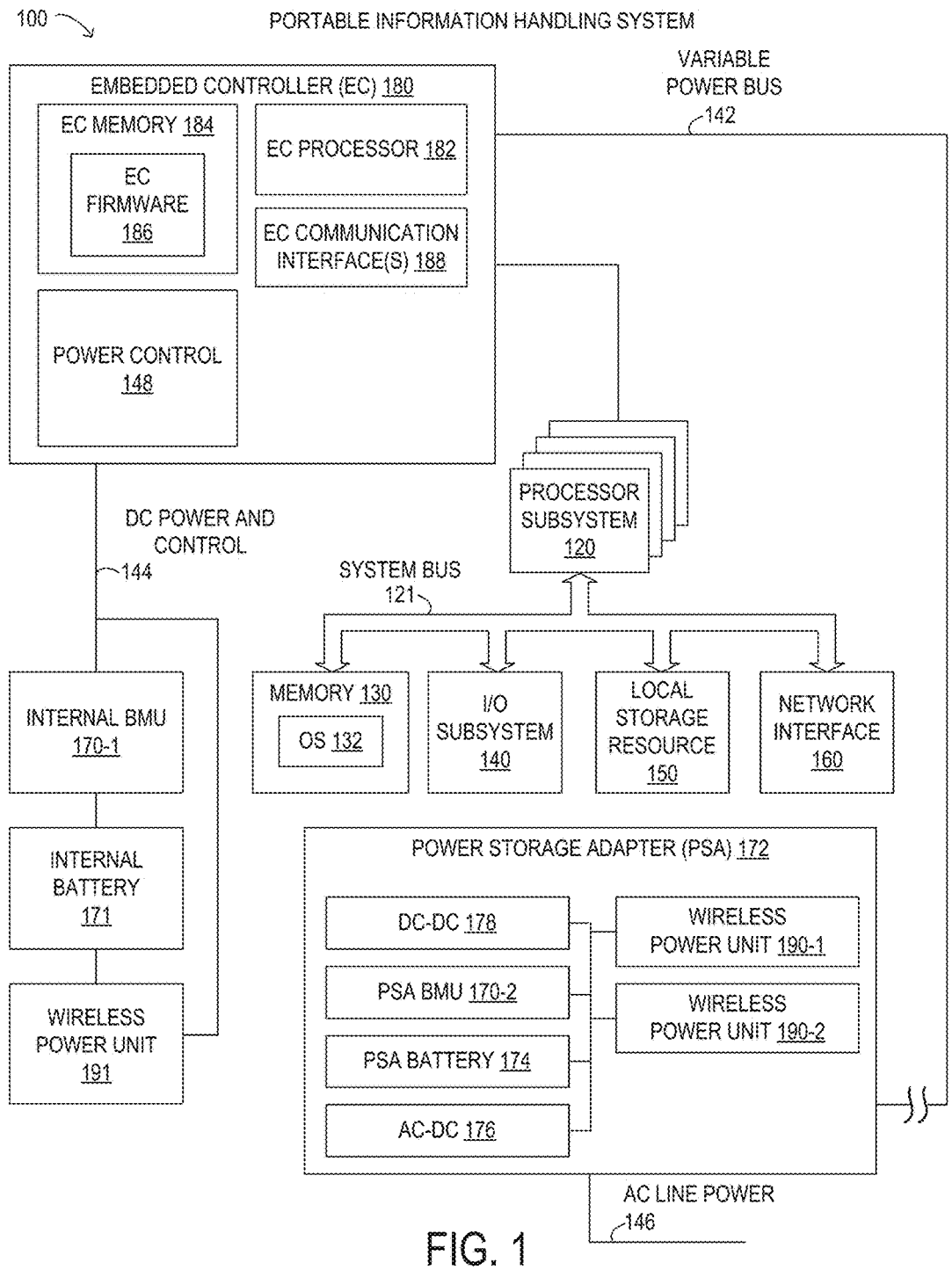
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 4A, 4B, 4C, 4D, 4E, 4F, and 6 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180, an internal battery management unit (BMU) 170-1 that manages an internal battery 171, and a wireless power unit 191. Furthermore, information handling system 100 is shown removably coupled to a power storage adapter 172 that incorporates various high efficiency features for use with portable information handling system 100, as disclosed herein. As shown, power storage adapter 172 may be an external device to portable information handling system 100 and may transmit wireless power wirelessly to portable information handling system 100 via wireless power unit 191, as described in further detail below. Also shown, power storage adapter 172 may be coupled to portable information handling system 100 using a variable power bus 142, for example, using an appropriate connector, as described in further detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170-1. Thus, EC processor 182 may have access to EC memory 184, which may store EC firmware 186, representing instructions executable by EC processor 182.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

Also shown within embedded controller 180 is power control 148, which may be responsible for communication of wireless power transmission information between power storage adapter 172, wireless power unit 191, and portable information handling system 100. Power control 148 may further be responsible for managing wireless power transmissions between power storage adapter 172, wireless power unit 191, and portable information handling system 100. In some embodiments, power control 148 may be implemented as a separate controller external to embedded controller 180. For example, when power control 148 receives a request from power storage adapter 172 to determine whether portable information handling system 100 is enabled to receive or transmit wireless power, power control 148 may transmit a response that indicates portable information handling system 100 is enabled to receive wireless power. The response may also include a request for a first wireless power to receive and other wireless power transmission information. When power control 148 receives a response from power storage adapter 172 that indicates power storage adapter will transmit the first wireless power, power control 148 may enable wireless power unit 191 to receive the first wireless power.

Power control 148 may further be responsible for managing wireless power transmissions between power storage adapter 172, wireless power unit 191, and portable information handling system 100. When wireless power unit 191 receives the first wireless power, power control 148 may further be responsible for managing electrical power connections between wireless power unit 191 and internal BMU 170-1. For example, when portable information handling system 100 receives the first wireless power from power storage adapter 172, power control 148 may determine whether the first wireless power is used to charge internal battery 171 or to directly power portable information handling system 100. Power control 148 may also manage so-called 'soft start up' of portable information handling system 100, such as when portable information handling system 100 awakes from a low power state, such as sleep mode, by determining a source of power during the low power state and managing operation of portable information handling system 100 during the low power state. Power control 148 may accordingly route the first wireless power and communicate with wireless power unit 191 and internal BMU 170-1 via DC power and control 144, which may represent suitable connections between embedded controller 180, wireless power unit 191, and internal BMU 170-1, for example. It is noted that in some embodiments, at least certain portions of power control 148 may be implemented using EC firmware 186, such as specialized executable instructions for power management and control.

As illustrated in FIG. 1, power storage adapter 172 may include wireless power units 190-1 and 190-2. Power storage adapter 172 may control wireless power transmission from each of wireless power units 190-1 and 190-2 to a corresponding wireless power unit 191 of a portable information handling system 100 enabled to receive wireless power. Power storage adapter 172 may also control wireless power reception of each of wireless power units 190-1 and 190-2 from a corresponding wireless power unit 191 of a charging device (see FIG. 4, charging device 410) enabled to transmit wireless power.

Wireless power unit 191 may include a coil (see FIG. 2, coil 293) which power control 148 enables to receive wireless power from a charging device, such as for example power storage adapter 172. Wireless power units 190-1 and 190-2 may include reconfigurable coils (see FIG. 2, reconfigurable coils 296-1 and 296-2 respectively). When power storage adapter 172 determines that portable information handling system 100 is in proximity of one of the reconfigurable coils and is enabled to receive wireless power, the corresponding wireless power unit 190 may configure the reconfigurable coil to transmit wireless power.

Power storage adapter 172 may convert a DC voltage into a high frequency alternating current that is sent to the transmitter reconfigurable coil by the corresponding wireless power unit 190. For example, the DC voltage may be converted into the high frequency alternating current using a high frequency switching power amplifier having a frequency of 108 kh. The high frequency alternating current induces a time varying magnetic field in the transmitter reconfigurable coil. The high frequency alternating current flowing within the transmitter reconfigurable coil generates an induced electro-magnetic field (EMF) into the adjacent receive coil of portable information handling system 100 by mutual inductance. The EMF generates a high frequency alternating current within the receive coil. The high frequency alternating current flowing within the receive coil may be converted into direct current (DC) by wireless power unit 191, which may be used to charge internal battery 171 or provide electrical power to portable information handling system 100.

Power storage adapter 172 and portable information handling system 100 may use resonance in order to achieve coupling of the transmitter reconfigurable coil and the receive coil at the same frequency. The transmitter reconfigurable coil and the receive coil oscillate or resonant at the same frequency. Power storage adapter 172 and portable information handling system 100 may also use non-resonance to achieve coupling, where the transmitter reconfigurable coil may operate at a different frequency from the receive coil. The transmitter reconfigurable coil and the receive coil may have the same coil sizes or different coil sizes.

Power control 148 may also be responsible for managing electrical power connections between power storage adapter 172, internal BMU 170-1, and to portable information handling system 100. For example, when variable power bus 142 supplies electrical power to portable information handling system 100, power control 148 may determine whether the electrical power is used to charge internal battery 171 or to directly power portable information handling system 100. Power control 148 may accordingly route electrical power and communicate with internal BMU 170-1 via DC power and control 144 for example.

In particular embodiments, embedded controller 180 may support a variable power bus 142, which may represent a data bus that also carries and distributes electrical power to and from portable information handling system 100. In various embodiments, variable power bus 142 supports different levels of direct-current (DC) power that may be provided to certain peripherals connected to I/O subsystem 140. In particular embodiments, variable power bus 142 may be used to receive DC power from an external source, such as a power storage adapter 172. For example, the DC power received from the external source may be routed via DC power connection 144 to internal BMU 170-1 for purposes of charging internal battery 171 or otherwise powering portable information handling system 100.

In certain embodiments, variable power bus 142 is implemented according to an industry standard, such as a Universal Serial Bus (USB), which is developed and supported by the USB Implementers Forum, Inc. (USB IF, www.usb.org). In particular, variable power bus 142 may be implemented as a USB Type-C bus that may support different USB devices, such as USB Type-C devices with USB Type-C connectors. Accordingly, variable power bus 142 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B SuperSpeed, Mini-A, Mini-B, Micro-A, Micro-B, Micro-B SuperSpeed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF (http://www.usb.org/developers/powerdelivery/). Examples of source power rules governed by the USB Power Delivery Specification, revision 2.0, version 1.2 are given in Table 1 below.

TABLE 1

USB Power Delivery revision 2.0, version 1.2 source power rules.

| Source Output Power [W] | Current [A] at +5 V DC | Current [A] at +9 V DC | Current [A] at +15 V DC | Current [A] at +20 V DC |
|---|---|---|---|---|
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 W to 100 W.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When a counterparty does not respond within the timeout, a pending request or other communication may fail. It is also noted that in some embodiments, a power delivery contract for zero electrical power may be established, such that no power is transferred but the power port pair remains connected over the USB connection.

As illustrated in FIG. 1, each of portable information handling system 100 and power storage adapter 172 may include a battery management unit (BMU) 170 that controls operation of a respective battery. In particular implementations, BMU 170 may be embedded within a respective battery whose operation BMU 170 controls. For example, internal BMU 170-1 within portable information handling system 100 may control operation of an internal battery 171, while PSA BMU 170-2 within power storage adapter 172 may control operation of a PSA battery 174. More specifically, BMU 170-1 may monitor information associated with, and control charging operations of, internal battery 171, while BMU 170-2 may monitor information associated with, and control charging operations of, PSA battery 174. In operation, each BMU 170 may control operation of a respective battery to enable sustained operation, such as by protecting the battery. Protection of the battery by BMU 170 may comprise preventing the battery from operating outside of safe operating conditions, which may be defined in terms of certain allowable voltage and current ranges over which the battery can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, a battery (such as internal battery 171 or PSA battery 174 illustrated in FIG. 1) may be considered to be discharged when an SOC of the battery corresponds to an SOC that is below a predetermined threshold percentage or amount below the 100% charge level given by the TOC voltage, such as below a 5% charge level in one example. A battery may be considered to be charged, i.e., at least partially charged, when the SOC for the battery corresponds to an SOC that is above a first predetermined threshold percentage or amount below the 100% charge level given by the TOC voltage, such as above the 25% charge level in one example. A battery may be considered to be fully charged when the SOC of the battery corresponds to an SOC that is above a second predetermined threshold percentage or amount below the 100% charge level given by the TOC voltage, such as above the 95% charge level for example. A battery may be considered to be at least partially discharged when the SOC of the battery corresponds to an SOC that is below the 100% charge level. The parameters for specifying an SOC described above are examples and may be modified using different values in different embodiments.

In various embodiments, a battery (such as internal battery 171 or PSA battery 174 illustrated in FIG. 1) may include one or more cells having a particular chemistry in a particular cell configuration. For example, in one embodiment, the battery may include four Lithium-ion cells in a two parallel-two serial (2S-2P) configuration. In other embodiments, the battery may include a different number of cells or may include multiple cells in a different configuration. For example, the battery may include three or more cells in various configurations. In some embodiments, the battery may include one or more cells based on any one of a variety of Lithium-ion electrochemistries, or one or more cells based a different electrochemistry than Lithium-ion.

As shown in FIG. 1, power storage adapter 172 may be designed to removably couple to portable information handling system 100 using variable power bus 142. For example, variable power bus 142 may include power connections for electrically coupling power storage adapter 172 to portable information handling system 100 as an external load on power storage adapter 172. Variable power bus 142 may also include a communication link to enable power storage adapter 172 to communicate with portable information handling system 100, such as via embedded controller 180. For example, power storage adapter 172 may communicate battery data collected locally at power storage adapter 172 to portable information handling system 100 over a communication link within variable power bus 142. In other embodiments, there may be a communication link between power storage adapter 172 and portable information handling system 100 that is separate from variable power bus 142 instead of, or in addition to, a communication link that is part of variable power bus 142. In some embodiments, a communication link between power storage adapter 172 and portable information handling system 100, or DC power and control 144, may operate in accordance with a System Management Bus (SMBus) protocol for sending and receiving data. As noted above, in particular embodiments, variable power bus 142 is compatible with USB Type-C and may be implemented according to USB Type-C and USB Power Delivery specifications promulgated by USB IF.

In various embodiments, each of internal battery 171 or PSA battery 174 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. The temperature sensor may be located in proximity to the battery cells to provide an accurate indication of a temperature within the battery. The fuse may be a safety element for limiting current flowing through the main power circuit. The power switch may be an electronically controlled switching element that closes or opens the main power circuit, and thereby allows the battery to operate for charging or discharging.

In FIG. 1, each BMU 170 may include a charging unit (see FIG. 2, charging unit 246) that may control charging cycles for a battery and may apply a TOC voltage as a threshold to determine when charging is complete as the battery voltage increases during charging. The TOC voltage may be lower than or equal to the maximum charge voltage that the battery can physically sustain, in different embodiments. Depending on the actual value for the TOC voltage, a given energy capacity may be stored using the battery. BMU 170 may also be enabled to obtain various types of information associated with a battery and to make decisions according to the obtained information. For example, each BMU 170 may monitor various charging-related parameters or other operating parameters received from one or more batteries, including parameters received from a local battery or parameters received from a remote battery over variable power bus 142.

In some embodiments, parameters monitored by a BMU 170 may include a charging current, a voltage, and a temperature associated with a battery. More specifically, the parameters monitored by the BMU 170 may include any or all of the cell configuration and chemistry of battery cells within the battery, the total voltage of the battery, the voltages of individual battery cells, minimum or maximum cell voltages, the average temperature of the battery as a whole, the temperatures of individual battery cells, the SOC of the battery, the depth of discharge of the battery, the current flowing into the battery, the current flowing out of the battery, and any other measurement of the overall condition of the battery, in various embodiments. In some embodiments, monitoring the SOC may include continuous or periodic monitoring of battery output current, voltage, or both. In some cases, Coulomb counting, in which the charge delivered or stored by a battery is tracked, is used for battery monitoring. In some embodiments, a battery temperature may be monitored through the use of periodic voltage measurements, a thermometer, or any other method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to another device, such as information associated with PSA battery 174 that is provided to or obtained by PSA BMU 170-2 on power storage adapter 172, and which may be provided to portable information handling system 100 over variable power bus 142.

In some embodiments, BMU 170 may calculate additional values, based on the monitored battery parameters or other information obtained from a battery, for example, in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100 or power storage adapter 172, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof. In some embodiments, information indicating an alert condition for PSA battery 174 that is detected by PSA BMU 170-2 on power storage adapter 172 may be provided to portable information handling system 100 over variable power bus 142.

In various embodiments, BMU 170 may further include a DC boost converter (see FIG. 2, DC boost converter 248) that is capable of boosting the voltage provided by the cells within a battery. The DC boost converter may be externally controlled to provide a desired boost voltage output from the battery, such as in response to a control signal or other trigger condition. Because the internal output voltage of the battery may be constrained by the particular battery electrochemistry used to implement the cells, the DC boost converter may enable the battery to output a higher voltage, as desired. In some embodiments, the DC boost converter may be a buck-boost type converter that can step up or step down an input DC voltage.

In some embodiments, embedded controller 180 may implement a voltage control module that senses the current drawn by an electrical load and provides a control signal to BMU 170-1 based on the current drawn by the electrical load. For example, the voltage control module may be implemented as executable code stored by EC memory 184, while the electrical load may be information handling system 100, or portions thereof. It may be advantageous, for example, to provide a higher voltage to the electrical load in order to minimize the power dissipated by losses incurred in transmitting current from internal battery 171 to the electrical load. In another embodiment, the voltage control module may provide control signals in response to a voltage set signal. The voltage set signal may instruct the voltage control module to control BMU 170-1 to produce a particular voltage at the load. For example, the particular voltage level may allow the load to operate in a desired mode of operation. In one embodiment, the particular voltage level indicated by the voltage set signal may be higher than the voltage output by cells within a battery. BMU 170-1 may boost the voltage output by the cells to the voltage indicated by the voltage set signal.

For example, in some embodiments, a battery (such as internal battery 171 or PSA battery 174 illustrated in FIG. 1) may provide electrical power to the information handling system 100 at an output voltage controlled by its respective BMU 170. In some cases, portable information handling system 100 may provide load state information to the voltage control module. In some embodiments, the load state information may be based on the operating mode of the load, or on a desired future operating mode of the load. The voltage control module may determine a voltage level based on the load state information, and may provide voltage control information based on the determined voltage level to internal BMU 170-1 or PSA BMU 170-2. In one embodiment, voltage control information provided to PSA BMU 170-2 may specify the output voltage level of power storage adapter 172. In another embodiment, voltage control information provided to PSA BMU 170-2 may indicate a preferred voltage range for the output voltage level of power storage adapter 172. In yet another embodiment, voltage control information provided to PSA BMU 170-2 may indicate that the output voltage level of power storage adapter 172 should be increased or should be decreased.

In certain embodiments, BMU 170 may include a processor and memory (not shown). The memory may store instructions executable by the processor to perform one or more of the methods described herein for obtaining and calculating values related to the operation and charging of a battery and for controlling the operation and charging of the battery. The memory may also store data, obtained and calculated values, thresholds, and parameters related to the methods described herein.

Figure 2:
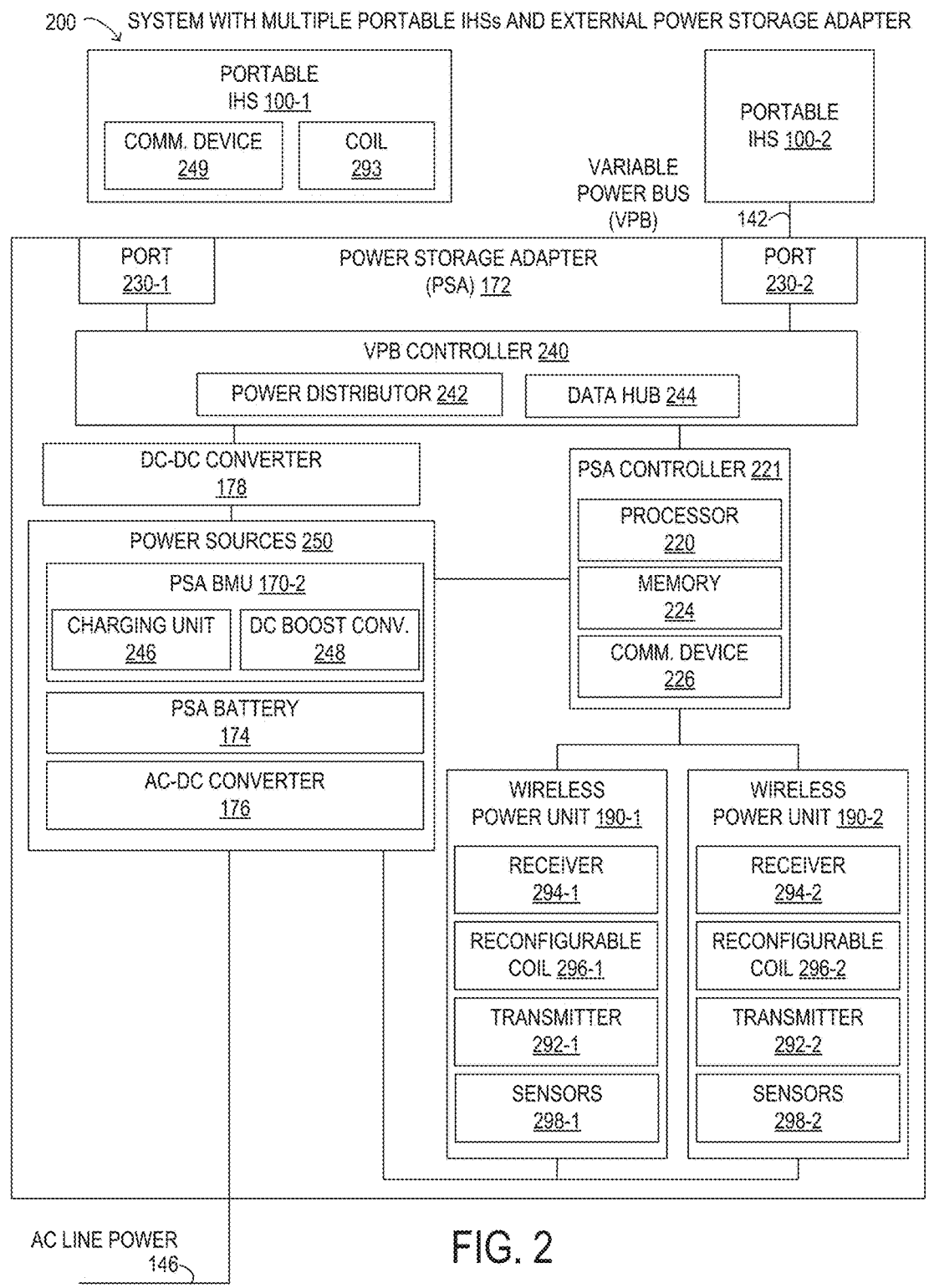
FIG. 2 is a block diagram of selected elements of an embodiment of multiple portable information handling systems with an external power storage adapter.

In FIG. 1, power storage adapter 172 is shown receiving AC line power 146 as an external power source. AC line power 146 may represent a connection to line power, such as using a standard line power cable. In some embodiments, AC line power 146 may be a removable connection, such as a cable that plugs into line power in a wall socket, and plugs into a corresponding receptacle included with power storage adapter 172. Also included within power storage adapter 172 in FIG. 2 is AC-DC converter 176. AC-DC converter 176 may receive alternating current (AC) from AC line power 146 and may output one or more DC voltages for supplying electrical power to other components in power storage adapter 172. For example, an output DC voltage from AC-DC converter 176 may be supplied to PSA battery 174 for charging purposes. An output DC voltage from AC-DC converter 176 may be supplied to a DC-DC converter 178, which may then generate one or more other DC voltages.

Also, an output DC voltage from AC-DC converter 176 may be directly supplied to variable power bus 142, such as to fulfill a power contract, as described above. Additional details of power storage adapter 172 are described below with respect to FIGS. 2, 3, 4A, 4B, 4C, 4D, 4E, and 4F.

As will be described in further detail herein, a charging device may wirelessly transfer wireless power from the charging device to a portable information handling system, which may be used to charge one or more batteries of the portable information handling system. The charging device may transfer wireless power through electromagnetic inductive coupling of a transmit coil of the charging device and a receive coil of the portable information handling system. Typical charging devices have one transmit coil and one charging surface and may transfer wireless power to the portable information handling system when the portable information handling system is on or near the charging surface. However, when the portable information handling system is on or near another surface of the charging device, the charging device may not be able to transfer wireless power to the portable information handling system. For example, the charging surface of the charging device may be face down on a table top and the portable information handling system may be placed on the other non-charging surface of the charging device.

Therefore, a charging device, for example, power storage adapter 172 that may have a first surface (top surface) and a second surface (bottom surface) opposite the first surface, a first reconfigurable coil in proximity to the first surface, a second reconfigurable coil in proximity to the second surface, a first proximity sensor, and a second proximity sensor, may transfer wireless power to the portable information handling system when power storage adapter 172 detects a portable information handling system having a receive coil at one of the first surface and the second surface using the first proximity sensor and the second proximity sensor. The first reconfigurable coil in proximity to the first surface and second reconfigurable coil in proximity to the second surface allows free placement and orientation of the portable information handling system on or near either the first surface or the second surface of power storage adapter 172. As such, there is no up or down or face up or face down when placing the portable information handling system on or near power storage adapter 172. Various features and advantages of power storage adapter 172 for wireless power transmission are described in further detail herein.

Referring now to FIG. 2, selected elements of an embodiment of a system 200 with multiple portable information handling systems 100 and power storage adapter 172 are shown. FIG. 2 illustrates further internal details of power storage adapter 172. It is noted that FIG. 2 is not drawn to scale but is a schematic illustration. In various embodiments, power storage adapter 172 may be implemented using fewer or additional components than illustrated in FIG. 2.

In FIG. 2, portable information handling system 100-1 is on or near either a first surface or a second surface of power storage adapter 172 and power storage adapter 172 is coupled to portable information handling system 100-2 via variable power bus (VPB) 142, as described above with respect to FIG. 1. Additionally, power storage adapter 172 is also externally connected to AC line power 146, as described above with respect to FIG. 1.

As shown in FIG. 2, power storage adapter 172 includes power sources 250, a DC-DC converter 178, a VPB controller 240, two ports 230, and two wireless power units 190, as well as a PSA controller 221 comprising processor 220, memory 224, and a communication device 226. In FIG. 2, each of the two wireless power units 190 includes a transmitter 292, a receiver 294, a reconfigurable coil 296, and sensors 298. As shown, power sources 250 comprise an AC-DC converter 176, a PSA battery 174, and a PSA BMU 170-2. In FIG. 2, PSA BMU 170-2 is shown including a charging unit 246 and a DC boost converter 248, while VPB controller 240 is shown including a power distributor 242 and a data hub 244. In some embodiments, DC boost converter 248 may include buck-boost DC conversion functionality to step up or step down an input DC voltage. VPB controller 240 is depicted in FIG. 2 in an implementation with two ports 230-1 and 230-2 that support variable power bus 142. As noted above, variable power bus 142 may be compatible with USB Type-C specifications promulgated by USB IF. Accordingly, in particular embodiments, port 230-1 may be a USB Type-C port. In different embodiments, port 230-1 may also be a USB Type-C port or another type of port, such as a USB Type-A port, among others. Although two ports 230 are shown in the example embodiment of FIG. 2, it will be understood that power storage adapter 172 may include fewer or more ports 230 in different embodiments.

As shown in FIG. 2, power storage adapter 172 includes PSA controller 221, which may perform various actions and functions. In some embodiments, PSA controller 221 is implemented using a custom integrated circuit, or a customizable integrated circuit, such as a field programmable gate array (FPGA). In the embodiment shown in FIG. 2, PSA controller 221 includes processor 220 and memory 224, which may store executable instructions (such as executable code) that may be executed by processor 220, which has access to memory 224. PSA controller 221 also includes communication device 226. Processor 220 is typically implemented as an integrated circuit, such as a microprocessor or microcontroller, and is enabled to execute instructions that cause power storage adapter 172 to perform the functions and operations described herein. For the purposes of this disclosure, memory 224 may include non-transitory computer-readable media that stores data and instructions for at least a period of time. Memory 224 may comprise persistent and volatile media, fixed and removable media, and magnetic and semiconductor media. Memory 224 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM) or flash memory, non-transitory media, or various combinations of the foregoing. Memory 224 is operable to store instructions, data, or both. Memory 224 may store sets or sequences of instructions that may represent executable computer programs for implementing various functionality provided by power storage adapter 172.

Sensors 298 may be used to detect portable information handling system 100-1 and or a charging device in proximity of one of a first surface and a second surface (See FIG. 3, first surface 304 and second surface 306) of power storage adapter 172. Portable information handling system 100-1 and or the charging device may be on or near one of the first surface and the second surface when in proximity of power storage adapter 172. Sensors 298 may include one or more of a proximity sensor, a wireless communication device, a track sensor device, a touch sensor device, an optical sensor device, and an eddy current sensor device, among other types of sensor devices. The wireless communication device may be communication device 226. Power storage adapter 172 may collect sensor feedback information from sensors 298 to determine, based on the sensor feedback information, the relative distance between portable information handling system 100-1 and or the charging device and one of the first surface and the second surface of power storage adapter 172, the relative position of portable information handling system 100-1 and or the charging device on or near one of the first surface and the second surface, the proximity of portable information handling system 100-1 and or the charging device on or near one of the first surface and the second surface and the eddy current induced by the magnetic flux between reconfigurable coil 296 and a receive coil 293 of portable information handling system 100-1 and or a transmit coil 293 of the charging device.

Communication device 226 may be a wireless communication device that may be used to communicate wireless power information between communication device 226 and a communication device 249-1 of portable information handling system 100-1. Each of communication device 226 and communication device 249-1 may be a Bluetooth device, an infrared device, a near field communication device, a Zigbee device, among other types of wireless communication devices. Communication device 226 may also control each transmitter 292 to communicate wireless power information to a corresponding receiver of a wireless power unit 191. For example, communication device 226 may control each transmitter 292 to use frequency shift keying, in which transmitter 292 modulates the operating frequency of the wireless power signal to communicate to the corresponding receiver of wireless power unit 191. Transmitter 292 may use a differential bi-phase encoding scheme to modulate data bits in the wireless power signal to communicate the wireless power information to the corresponding receiver of wireless power unit 191 and to communication device 249-1. Communication device 249-1 may control the receiver of wireless power unit 191, which may decode the wireless power information received from transmitter 292. Further, the receiver of wireless power unit 191 may modulate the amount of wireless power it draws from the wireless power signal to communicate a response to transmitter 292. Transmitter 292 may detect this as a modulation of current through and or voltage at wireless power unit 190. In other words, the receiver of wireless power unit 191 and transmitter 292 may use an amplitude modulated wireless power signal to provide a power receiver to power transmitter communications channel. In a similar manner as described above, communication device 226 may also control each receiver 294 to communicate wireless power information between receiver 294 and a corresponding transmitter of a charging device (See FIG. 4, charging device 410). For example, the transmitter of the charging device and receiver 294 may use both frequency modulated wireless power signal and amplitude modulated wireless power signal to provide a power transmitter and power receiver communications channel.

One of transmitters 292 may be used to transmit wireless power wirelessly to portable information handling system 100-1 by configuring reconfigurable coil 296 as a transmit coil. Similarly, one of receivers 294 may be used to receive wireless power wirelessly from a charging device by configuring reconfigurable coil 296 as a receive coil. Operation of sensors 298, communication device 226, wireless power units 190, transmitters 292, receivers 294, and reconfigurable coils 296 will be described in further detail below with reference to FIGS. 3, 4A, 4B, 4C, 4D, 4E, and 4F.

The functionality and implementation details of certain elements in power storage adapter 172, such as AC-DC converter 176, PSA battery 174, PSA BMU 170-2, and DC-DC converter 178, are described above with respect to FIG. 1.

As shown, VPB controller 240 may include power distributor 242, which may represent various electronic components that enable distribution of DC power with respect to variable power bus 142 via ports 230. Specifically, power distributor 242 may receive at least one DC power input from DC-DC converter 178. Power distributor 242 may route or switch power connections to respective ports 230, for example, to enable fulfillment of a power contract, as described above. A power contract established by VPB controller 240, such as according to a USB Power Delivery Specification, may govern the supply of DC power to portable information handling system 100 via port 230-1. VPB controller 240 may also establish another power contract to supply DC power to another device coupled to port 230-2. In some embodiments, VPB controller 240 supplies DC power to both port 230-1 and port 230-2. Power distributor 242 may supply different DC voltages for output power at different ports 230. In particular embodiments, power distributor 242 supplies a different DC voltage to port 230-1 than to port 230-2.

In FIG. 2, data hub 244 may represent electronic functionality to manage various VPB connections over variable power bus 142. Specifically, data hub 244 may control operation of power distributor 242 and may, in turn, be controlled by PSA controller 221, such as by executable code (not shown) stored in memory 224 and executed by processor 220. Additionally, data hub 244 may store state information for each respective port 230, such as USB state information. For example, data hub 244 may store information associated with power contracts that power storage adapter 172 has established or is in the process of negotiating. Accordingly, data hub 244 may store various information about different VPB devices connected to power storage adapter 172 via ports 230. As used herein, the phrase "power consuming device" may refer to any system, apparatus, or device consuming the electrical power provided by a battery. For example, a portable information handling system may consume power for components such as one or more displays, processors, storage media, memory, or other components.

In the illustrated embodiment, charging unit 246 of BMU 170-2 may draw electrical power from AC-DC converter 176, and may, in turn output a charging voltage and charging current suitable to charge the cells of PSA battery 174. The charging voltage and the charging current demands of the battery may be dependent on an electrochemistry or a cell configuration of the battery cells. The charging of the battery may be limited by the current supply capability of the DC source. In some embodiments, the DC source may be AC-DC converter 176. Once the battery reaches 100% state of charge, BMU 170-2 may stop drawing current from the AC-DC converter 176. When a boost source of power is desired, charging unit 246 may also be enabled to supply electrical from PSA battery 174, which is then boosted to a desired output voltage by DC boost converter 248.

In some embodiments, portable information handling system 100 may communicate with power storage adapter 172 to instruct PSA BMU 170-2 to charge the battery cells of PSA battery 174. As previously noted, PSA BMU 170-2 may send information to portable information handling system 100, such as the cell configuration, the state of charge of the battery, or other information. Portable information handling system 100 may communicate with PSA BMU 170-2 using a system management bus (not shown), for example System Management Bus (SMBus) promulgated by SBS Implementers Forum (www.smbus.org), in some embodiments.

Figure 3:
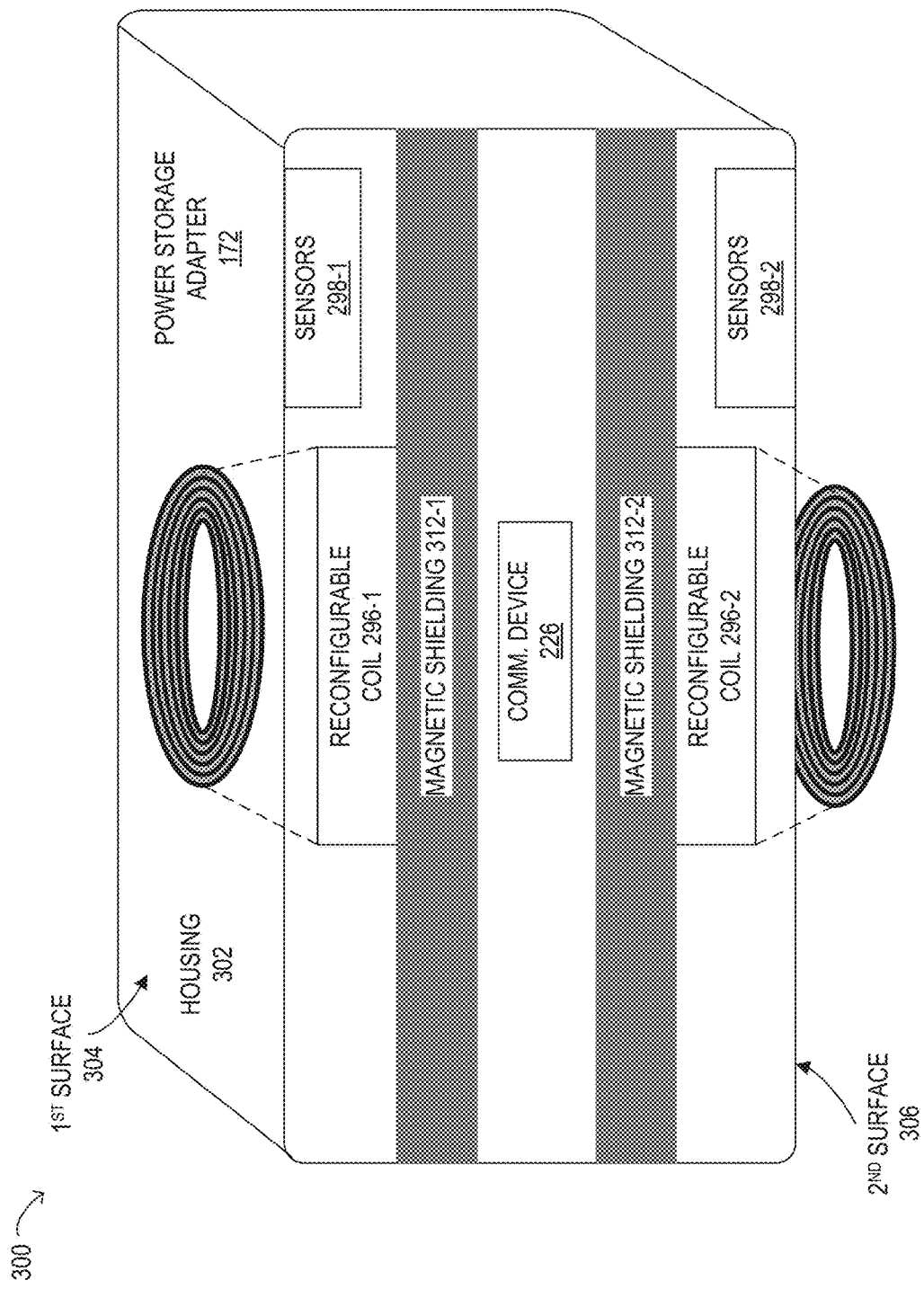
FIG. 3 is a block diagram of selected elements of an embodiment of a power storage adapter.

Referring now to FIG. 3, a power storage adapter 300 is illustrated in particular detail. Specifically, power storage adapter 300 is an embodiment of power storage adapter 172 shown in FIGS. 1 and 2 with particular elements and components illustrated. It is noted that FIG. 3 is not drawn to scale but is a schematic illustration. In various embodiments, power storage adapter 300 may be implemented using fewer or additional components than illustrated in FIG. 3.

As shown in FIG. 3, components of power storage adapter 172 may include, but are not limited to, a housing 302 having a first surface 304 and a second surface 306, and communication device 226, reconfigurable coil 296-1, reconfigurable coil 296-2, sensors 298-1, sensors 298-2, a magnetic shielding 312-1, and a magnetic shielding 312-2 within housing 302. Reconfigurable coil 296-1 may be between first surface 304 and magnetic shielding 312-1. Reconfigurable coil 296-2 may be between second surface 306 and magnetic shielding 312-2. Sensors 298-1 may be included in first surface 304, between first surface 304 and magnetic shielding 312-1, or any combination of the two. Sensors 298-2 may be included in second surface 306, between second surface 306 and magnetic shielding 312-2, or any combination of the two.

Magnetic shielding 312-1 and 312-2 may include at least one of a ferrite and a mu-metal including a nickel-iron alloy, copper, chromium, and molybdenum. Magnetic shielding 312-1 may be used to divert a first magnetic flux of reconfigurable coil 296-1 away from reconfigurable coil 296-2. Magnetic shielding 312-1 may also be used to generate a first opposing magnetic flux to remove effects of the first magnetic flux on reconfigurable coil 296-2. Magnetic shielding 312-2 may be used to divert a second magnetic flux of reconfigurable coil 296-2 away from reconfigurable coil 296-1. Magnetic shielding 312-2 may also be used to generate a second opposing magnetic flux to remove effects of the second magnetic flux on reconfigurable coil 296-1.

Referring now to FIG. 4A, illustrates an embodiment of operation of power storage adapter 172 for wireless power transmission with portable information handling system 100-1. It is noted that FIG. 4A is not drawn to scale but is a schematic illustration. In various embodiments, power storage adapter 172 may be implemented using fewer or additional components than illustrated in FIG. 4A.

In FIG. 4A, PSA controller 221 may detect portable information handling system 100-1 having a coil 293 at first surface 304 using sensors 298-1. PSA controller 221 may communicate with portable information handling system 100-1 using communication device 226 to exchange wireless power information. PSA controller 221 may determine whether portable information handling system 100-1 may be enabled to receive or transmit wireless power based on the received wireless power information from portable information handling system 100-1. PSA controller 221 may also determine a wireless power 420 requested by portable information handling system 100-1 based on the received wireless power information. When portable information handling system 100-1 may be enabled to receive wireless power, PSA controller 221 may configure reconfigurable coil 296-1 as a transmit coil. When portable information handling system 100-1 may be enabled to receive wireless power, power storage adapter 172 may transmit wireless power 420 to coil 293 at first surface 304 based on sensors 296-1 using transmitter 292-1 and reconfigurable coil 296-1. Wireless power 420 is transmitted wirelessly to portable information handling system 100-1 by magnetic flux 414 generated by reconfigurable coil 296-1 and coupled to coil 293.

In one or more embodiments, when AC line power source 146 is not coupled to power storage adapter 172 or not enabled to receive power from AC line power source 146, wireless power 420 may be supplied from PSA battery 174. When AC line power source 146 is coupled to power storage adapter 172 and enabled to receive power from AC line power source 146, wireless power 420 may be supplied from AC line power source 146.

Referring now to FIG. 4B, illustrates an embodiment of operation of power storage adapter 172 for wireless power transmission with portable information handling system 100-1. It is noted that FIG. 4B is not drawn to scale but is a schematic illustration. In various embodiments, power storage adapter 172 may be implemented using fewer or additional components than illustrated in FIG. 4B.

In FIG. 4B, PSA controller 221 may detect portable information handling system 100-1 having a coil 293 at second surface 306 using sensors 298-2. PSA controller 221 may determine whether portable information handling system 100-1 may be enabled to receive or transmit wireless power based on the received wireless power information from portable information handling system 100-1. PSA controller 221 may also determine a wireless power 420 requested by portable information handling system 100-1 based on the received wireless power information. When portable information handling system 100-1 may be enabled to receive wireless power, PSA controller 221 may configure reconfigurable coil 296-2 as a transmit coil. When portable information handling system 100-1 may be enabled to receive wireless power, power storage adapter 172 may transmit wireless power 420 to coil 293 at second surface 304 based on sensors 296-2 using transmitter 292-2 and reconfigurable coil 296-2. Wireless power 420 is transmitted wirelessly to portable information handling system 100-1 by magnetic flux 414 generated by reconfigurable coil 296-2 and coupled to coil 293.

Figure 4C:
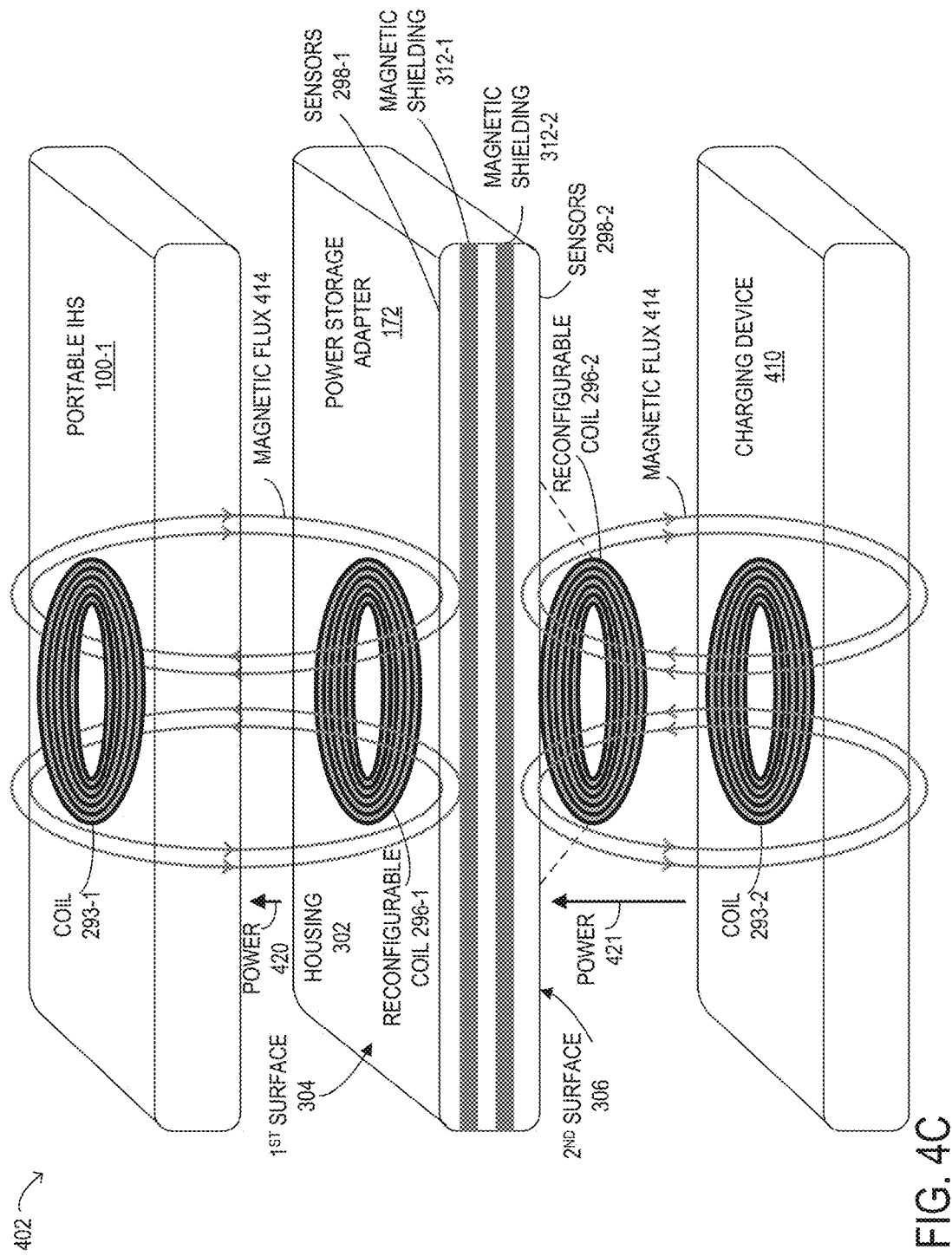

Referring now to FIG. 4C, illustrates an embodiment of operation of power storage adapter 172 for wireless power transmission with portable information handling system 100-1 and a charging device 410. It is noted that FIG. 4C is not drawn to scale but is a schematic illustration. In various embodiments, power storage adapter 172 may be implemented using fewer or additional components than illustrated in FIG. 4C.

In FIG. 4C, PSA controller 221 may detect portable information handling system 100-1 having a coil 293-1 at first surface 304 using sensors 298-1. PSA controller 221 may determine whether portable information handling system 100-1 may be enabled to receive or transmit wireless power based on received wireless power information from portable information handling system 100-1. PSA controller 221 may also determine a wireless power 420 requested by portable information handling system 100-1 based on the received wireless power information. When portable information handling system 100-1 may be enabled to receive wireless power, PSA controller 221 may configure reconfigurable coil 296-1 as a transmit coil. When portable information handling system 100-1 may be enabled to receive wireless power, power storage adapter 172 may transmit wireless power 420 to coil 293-1 at first surface 304 based on sensors 296-1 using transmitter 292-1 and reconfigurable coil 296-1.

PSA controller 221 may also detect charging device 410 having a coil 293-2 at second surface 306 using sensors 298-2. PSA controller 221 may determine whether charging device 410 may be enabled to receive or transmit wireless power based on received wireless power information from charging device 410. When charging device 410 may be enabled to transmit wireless power, PSA controller 221 may also determine a wireless power 421 to be received based on the received wireless power information. When charging device 410 may be enabled to transmit wireless power, PSA controller 221 may configure reconfigurable coil 296-2 as a receive coil. When charging device 410 may be enabled to transmit wireless power, power storage adapter 172 may receive wireless power 421 from coil 293-2 at second surface 306 based on sensors 296-2 using receiver 292-2 and reconfigurable coil 296-2. Power storage adapter 172 may wirelessly receive wireless power 421 simultaneous with power storage adapter 172 wirelessly transmitting wireless power 420.

In one or more embodiments, power storage adapter 172 may charge PSA battery 174 using wireless power 421. In some embodiments, charging device 410 may be a portable information handling system 100 that may be enabled to transmit wireless power.

Figure 4D:
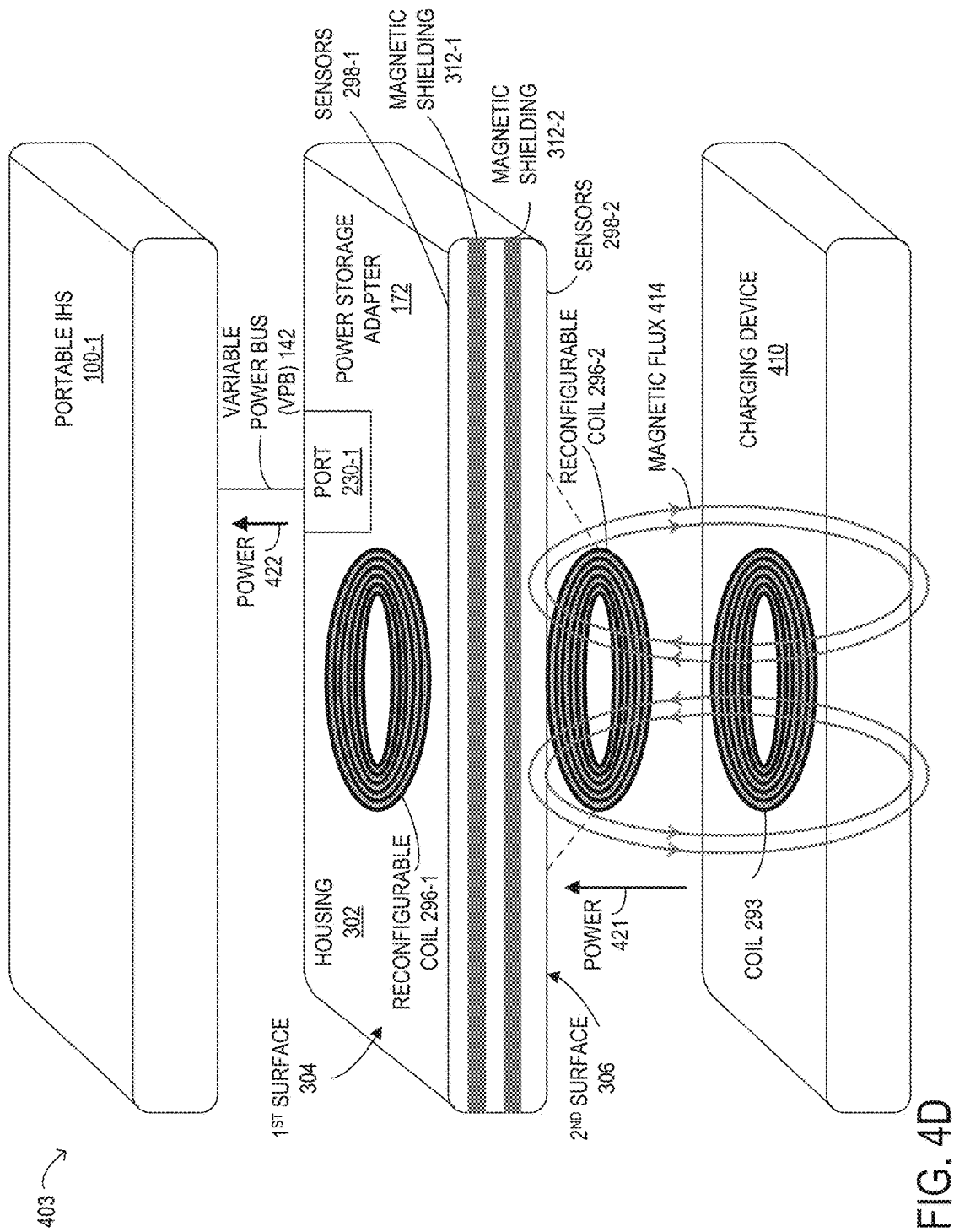

Referring now to FIG. 4D, illustrates an embodiment of operation of power storage adapter 172 for wireless power transmission with portable information handling system 100-1 and a charging device 410. It is noted that FIG. 4D is not drawn to scale but is a schematic illustration. In various embodiments, power storage adapter 172 may be implemented using fewer or additional components than illustrated in FIG. 4D.

In FIG. 4D, PSA controller 221 may receive a request for a power delivery contract from portable information handling system 100-1 coupled to power storage adapter 172 at PSA port 230-1. The power delivery contract may supply an electrical power 422 to portable information handling system 100-1. Responsive to receiving the request, power storage adapter 172 may establish the power delivery contract. Then, power storage adapter 172 may supply electrical power 422 to portable information handling system 100-1 via variable power bus 142.

PSA controller 221 may also detect charging device 410 having a coil 293 at second surface 306 using sensors 298-2. PSA controller 221 may determine whether charging device 410 may be enabled to receive or transmit wireless power based on received wireless power information from charging device 410. When charging device 410 may be enabled to transmit wireless power, PSA controller 221 may also determine a wireless power 421 to be received based on the received wireless power information. When charging device 410 may be enabled to transmit wireless power, PSA controller 221 may configure reconfigurable coil 296-2 as a receive coil. When charging device 410 may be enabled to transmit wireless power, power storage adapter 172 may receive wireless power 421 from coil 293 at second surface 306 based on sensors 296-2 using receiver 292-2 and reconfigurable coil 296-2. Power storage adapter 172 may wirelessly receive wireless power 421 simultaneous with power storage adapter 172 supplying electrical power 422.

Figure 4E:
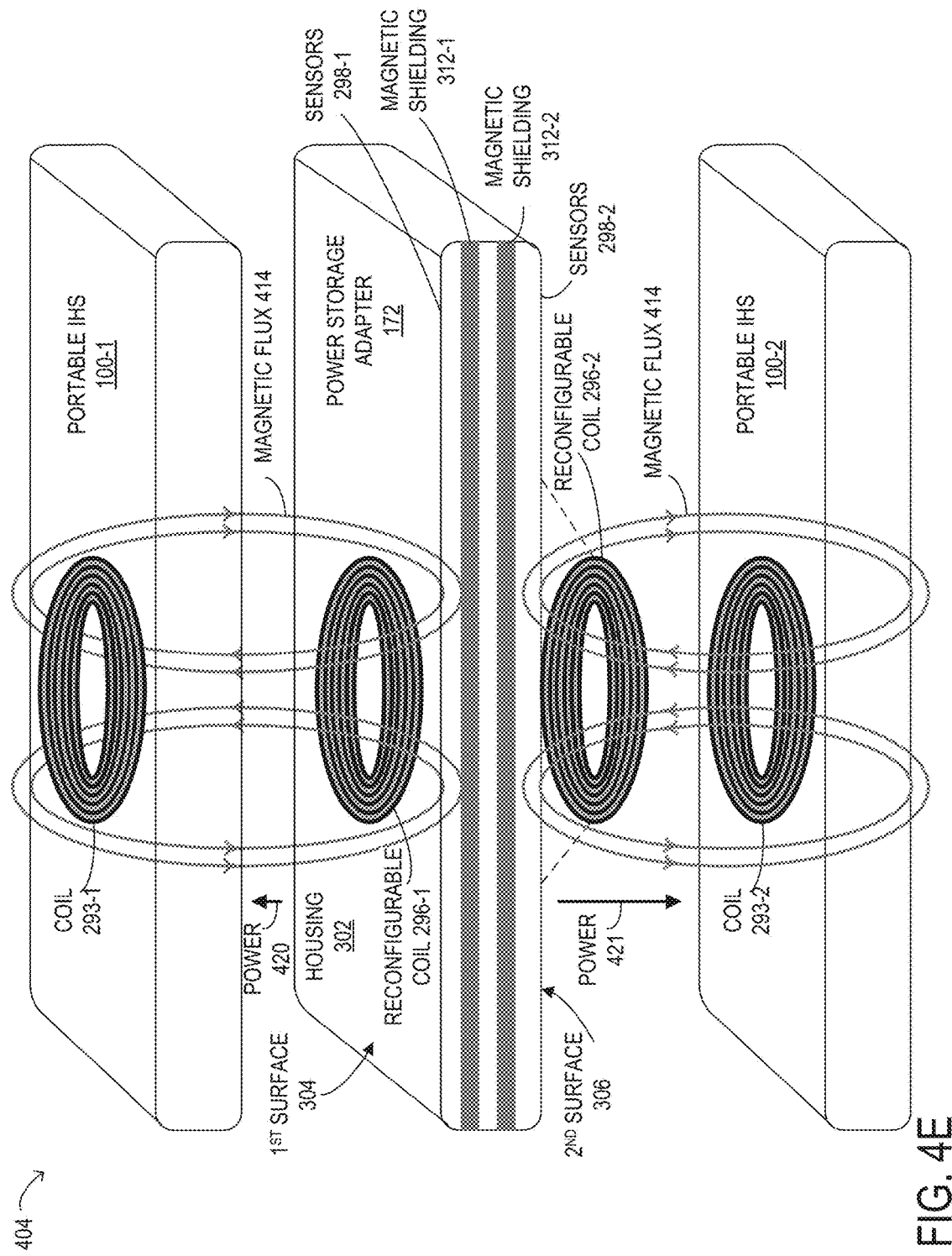

Referring now to FIG. 4E, illustrates an embodiment of operation of power storage adapter 172 for wireless power transmission with portable information handling systems 100-1 and 100-2. It is noted that FIG. 4E is not drawn to scale but is a schematic illustration. In various embodiments, power storage adapter 172 may be implemented using fewer or additional components than illustrated in FIG. 4E.

In FIG. 4E, PSA controller 221 may detect portable information handling system 100-1 having a coil 293-1 at first surface 304 using sensors 298-1. PSA controller 221 may determine whether portable information handling system 100-1 may be enabled to receive or transmit wireless power based on received wireless power information from portable information handling system 100-1. PSA controller 221 may also determine a wireless power 420 requested by portable information handling system 100-1 based on the received wireless power information. When portable information handling system 100-1 may be enabled to receive wireless power, PSA controller 221 may configure reconfigurable coil 296-1 as a transmit coil. When portable information handling system 100-1 may be enabled to receive wireless power, power storage adapter 172 may transmit wireless power 420 to coil 293-1 at first surface 304 based on sensors 296-1 using transmitter 292-1 and reconfigurable coil 296-1.

PSA controller 221 may also detect portable information handling system 100-2 having a coil 293-2 at second surface 306 using sensors 298-2. PSA controller 221 may determine whether portable information handling system 100-2 may be enabled to receive or transmit wireless power based on received wireless power information from portable information handling system 100-2. PSA controller 221 may also determine a wireless power 421 requested by portable information handling system 100-2 based on the received wireless power information. When portable information handling system 100-2 may be enabled to receive wireless power, PSA controller 221 may configure reconfigurable coil 296-2 as a transmit coil. When portable information handling system 100-2 may be enabled to receive wireless power, power storage adapter 172 may transmit wireless power 421 to coil 293-2 at second surface 306 based on sensors 296-2 using transmitter 292-2 and reconfigurable coil 296-2. Power storage adapter 172 may wirelessly transmit wireless power 420 simultaneous with power storage adapter 172 wirelessly transmitting wireless power 421.

Figure 4F:
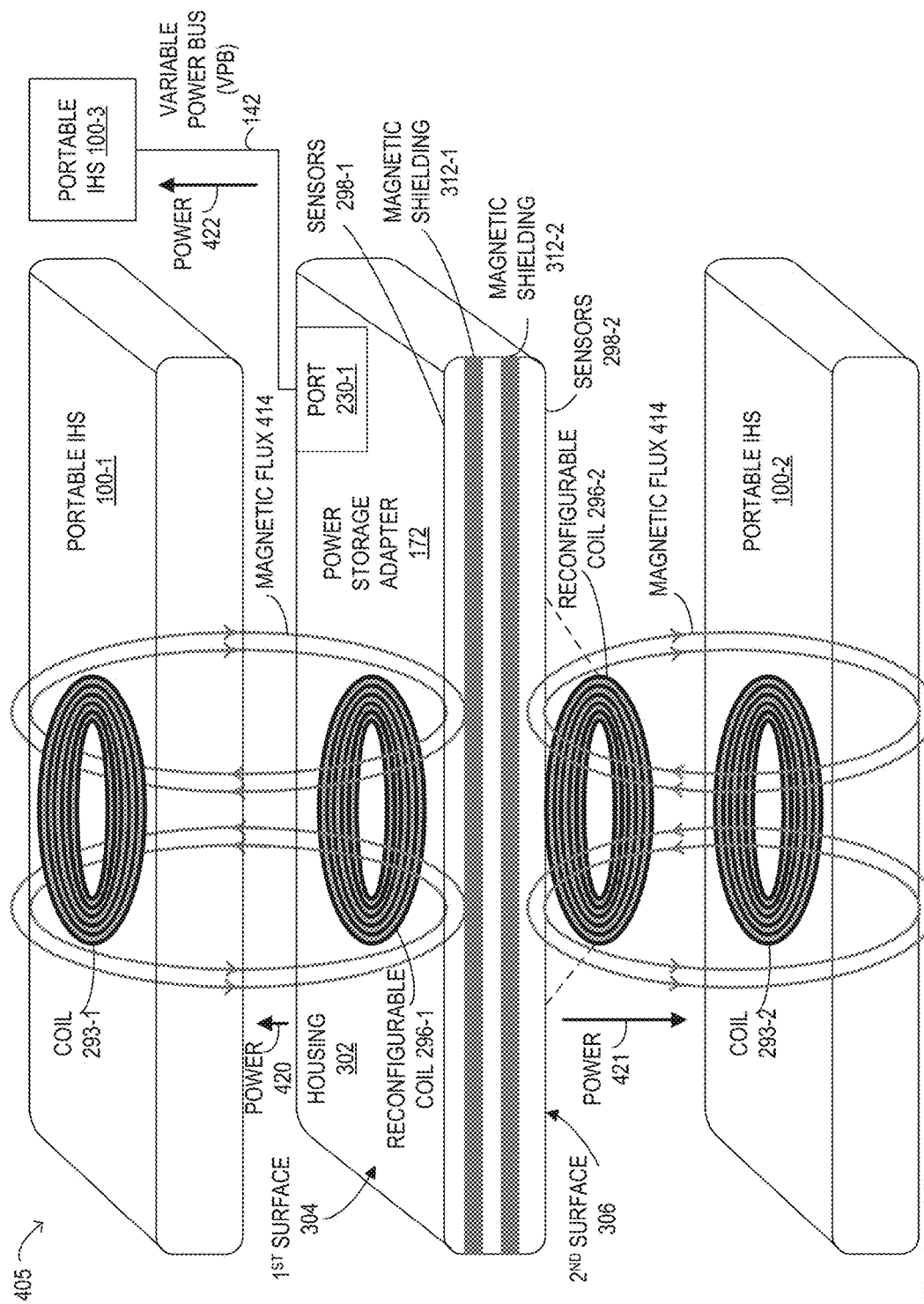

Referring now to FIG. 4F, illustrates an embodiment of operation of power storage adapter 172 for wireless power transmission with portable information handling systems 100-1, 100-2, and 100-3. It is noted that FIG. 4F is not drawn to scale but is a schematic illustration. In various embodiments, power storage adapter 172 may be implemented using fewer or additional components than illustrated in FIG. 4F.

In FIG. 4F, PSA controller 221 may detect portable information handling system 100-1 having a coil 293-1 at first surface 304 using sensors 298-1. PSA controller 221 may determine whether portable information handling system 100-1 may be enabled to receive or transmit wireless power based on received wireless power information from portable information handling system 100-1. PSA controller 221 may also determine a wireless power 420 requested by portable information handling system 100-1 based on the received wireless power information. When portable information handling system 100-1 may be enabled to receive wireless power, PSA controller 221 may configure reconfigurable coil 296-1 as a transmit coil. When portable information handling system 100-1 may be enabled to receive wireless power, power storage adapter 172 may transmit wireless power 420 to coil 293-1 at first surface 304 based on sensors 296-1 using transmitter 292-1 and reconfigurable coil 296-1.

PSA controller 221 may also detect portable information handling system 100-2 having a coil 293-2 at second surface 306 using sensors 298-2. PSA controller 221 may determine whether portable information handling system 100-2 may be enabled to receive or transmit wireless power based on received wireless power information from portable information handling system 100-2. PSA controller 221 may also determine a wireless power 421 requested by portable information handling system 100-2 based on the received wireless power information. When portable information handling system 100-2 may be enabled to receive wireless power, PSA controller 221 may configure reconfigurable coil 296-2 as a transmit coil. When portable information handling system 100-2 may be enabled to receive wireless power, power storage adapter 172 may transmit wireless power 421 to coil 293-2 at second surface 306 based on sensors 296-2 using transmitter 292-2 and reconfigurable coil 296-2.

PSA controller 221 may further receive a request for a power delivery contract from portable information handling system 100-3 coupled to power storage adapter 172 at PSA port 230-1. The power delivery contract may supply an electrical power 422 to portable information handling system 100-3. Responsive to receiving the request, power storage adapter 172 may establish the power delivery contract. Then, power storage adapter 172 may supply electrical power 422 to portable information handling system 100-3 via variable power bus 142. Power storage adapter 172 may wirelessly transmit wireless power 420 simultaneous with power storage adapter 172 wirelessly transmitting wireless power 421 and power storage adapter 172 supplying electrical power 422.

Figure 5:
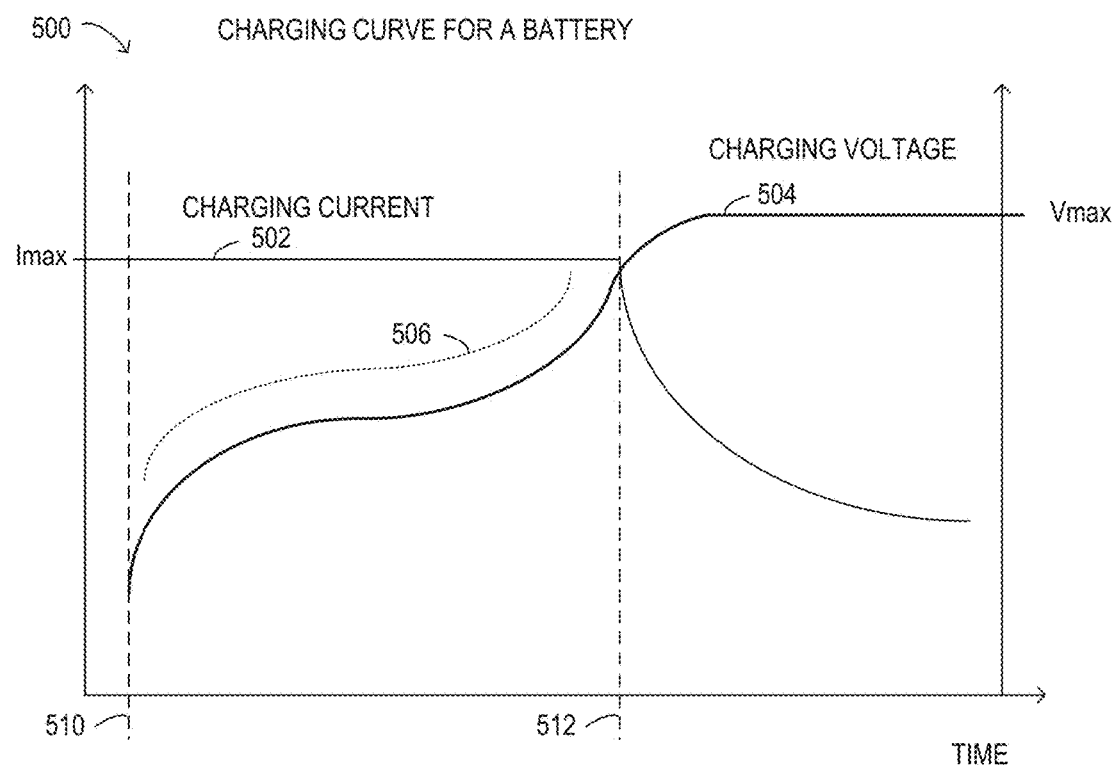
FIG. 5 is a plot showing selected elements of a charging curve for an information handling system battery.

FIG. 5 illustrates a charging curve 500 for a battery, such as internal battery 171 or PSA battery 174. Charging curve 500 is schematically illustrated and is not drawn to scale or perspective. Charging curve 500 may be implemented by BMU 170, for example, using charging unit 246 (see FIG. 2). Charging curve 500 depicts how a charging current 502 and a charging voltage 504 respond over time to various conditions. Specifically, at time 510, it is assumed that the battery is discharged and is charged by supplying charging current 502 that is constant, given by Imax, which is a maximum charging current. In the constant current charging regime between time 510 and time 512, charging voltage 504 may increase from a low value to a higher value as the SOC for the battery increases. At time 512, charging voltage 504 may approach a maximum value, given by Vmax, and may remain constant after time 512. At about time 512, meanwhile, charging current 502 may begin to decrease as the SOC for the battery increases at a lower rate. After time 512, in a constant voltage charging regime, charging current 502 may taper off until at some point, the SOC approaches a maximum value, and no further charging occurs.

Also shown in FIG. 5 is a boost charging voltage 506. Specifically, charging unit 246 may apply boost charging voltage 506 to improve a charging efficiency, for example, by reducing an amount of electrical power consumed during charging, as compared with supplying constant charging voltage Vmax.

Figure 6:
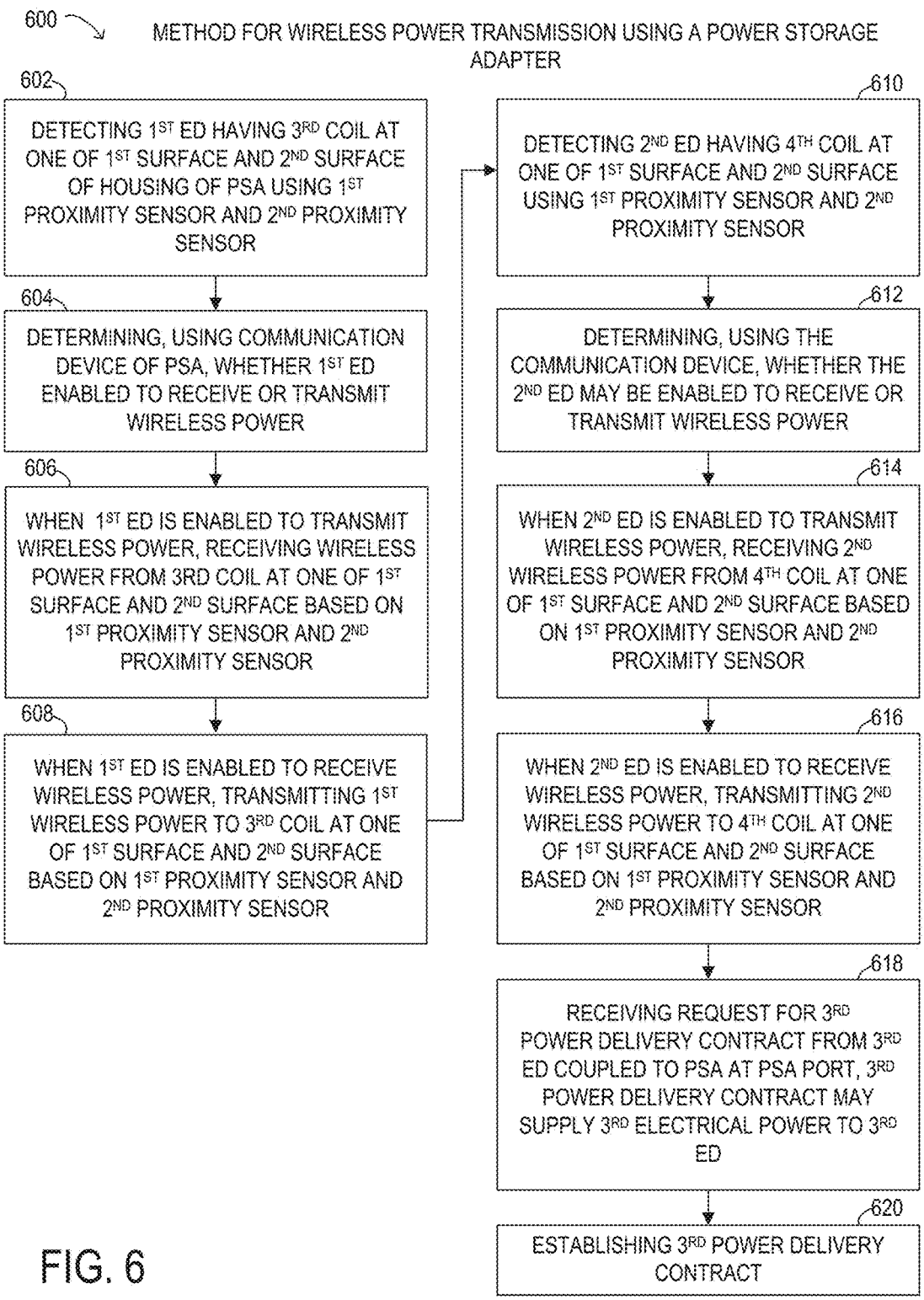
FIG. 6 is a flow chart of selected elements of a method for wireless power transmission of multiple portable information handling systems using a power storage adapter.

Referring now to FIG. 6, a flow chart of selected elements of an embodiment of method 600 wireless power transmission of multiple portable information handling systems using a power storage adapter, as described herein, is depicted in flowchart form. Method 600 may be performed using power storage adapter 172 and, in particular, by PSA controller 221. It is noted that certain operations described in method 600 may be optional or may be rearranged in different embodiments.

Method 600 may begin at, step 602, by detecting a first electronic device having a third coil at one of a first surface and a second surface of a housing of a power storage adapter using a first proximity sensor and a second proximity sensor of the power storage adapter. The second surface may be opposite the first surface. At step 604, determining, using a communication device of the power storage adapter, whether the first electronic device may be enabled to receive or transmit wireless power. At step 606, when the first electronic device may be enabled to transmit the wireless power, receiving the wireless power from the third coil at one of the first surface and the second surface based on the first proximity sensor and the second proximity sensor. At step 608, when the first electronic device may be enabled to receive the wireless power, transmitting a first wireless power to the third coil at one of the first surface and the second surface based on the first proximity sensor and the second proximity sensor. At step 610, detecting a second electronic device having a fourth coil at one of the first surface and the second surface using the first proximity sensor and the second proximity sensor. The second electronic device and the first electronic device may be detected at different surfaces. At step 612, determining, using the communication device, whether the second electronic device may be enabled to receive or transmit wireless power. At step 614, when the second electronic device may be enabled to transmit the wireless power, receiving a second wireless power from the fourth coil at one of the first surface and the second surface based on the first proximity sensor and the second proximity sensor. At step 616, when the second electronic device may be enabled to receive the wireless power, transmitting the second wireless power to the fourth coil at one of the first surface and the second surface based on the first proximity sensor and the second proximity sensor. Receiving or transmitting the second wireless power may be simultaneous with receiving or transmitting the first wireless power. At step 618, receiving a request for a third power delivery contract from a third electronic device coupled to the power storage adapter at the PSA port, the third power delivery contract may supply a third electrical power to the third electronic device. At step 620, responsive to receiving the request, establishing the third power delivery contract. Supplying the second wireless power may be simultaneous with receiving or transmitting the first wireless power.

As disclosed herein, a power storage adapter may include wireless power units for wireless power transmission of multiple portable information handling systems. In particular, when a wireless power unit wirelessly transmits a first wireless power to one of the portable information handling systems, another wireless power unit may wirelessly transmit a second wireless power to another portable information handling system. The transmission of the first wireless power may be simultaneous with the transmission of the second wireless power.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A power storage adapter (PSA), comprising:
a housing including a first surface and a second surface opposite the first surface;
a PSA port;

a PSA battery;
a first wireless power unit including a first transmitter, a first receiver, a first coil in proximity to the first surface, and a first proximity sensor;
a second wireless power unit including a second transmitter, a second receiver, a second coil in proximity to the second surface, and a second proximity sensor;
a first magnetic shield to divert a first magnetic flux of the first coil away from the second coil and to generate a first opposing magnetic flux to remove effects of the first magnetic flux on the second coil;
a second magnetic shield to divert a second magnetic flux of the second coil away from the first coil and to generate a second opposing magnetic flux to remove effects of the second magnetic flux on the first coil;
a communication device; and
a PSA controller having access to memory media storing instructions executable by the PSA controller to:
 detect a first electronic device having a third coil at one of the first surface and the second surface using the first proximity sensor and the second proximity sensor;
 determine, using the communication device, whether the first electronic device is enabled to receive or transmit wireless power;
 when the first electronic device is enabled to transmit the wireless power, receive a first wireless power from the third coil at one of the first surface and the second surface based on the first proximity sensor and the second proximity sensor; and
 when the first electronic device is enabled to receive the wireless power, transmit the first wireless power to the third coil at one of the first surface and the second surface based on the first proximity sensor and the second proximity sensor.

2. The power storage adapter of claim 1, further comprising instructions to, when the first electronic device is detected at the first surface:
when the first electronic device is enabled to transmit the wireless power, configure the first coil as a receive coil; and
when the first electronic device is enabled to receive the wireless power, configure the first coil as a transmit coil.

3. The power storage adapter of claim 1, further comprising instructions to, when the first electronic device is detected at the second surface:
when the first electronic device is enabled to transmit the wireless power, configure the second coil as a receive coil; and
when the first electronic device is enabled to receive the wireless power, configure the second coil as a transmit coil.

4. The power storage adapter of claim 1, further comprising instructions to:
detect a second electronic device having a fourth coil at one of the first surface and the second surface using the first proximity sensor and the second proximity sensor, wherein the second electronic device and the first electronic device are detected at different surfaces;
determine, using the communication device, whether the second electronic device is enabled to receive or transmit wireless power;
when the second electronic device is enabled to transmit the wireless power, receive a second wireless power from the fourth coil at one of the first surface and the second surface based on the first proximity sensor and the second proximity sensor; and
when the second electronic device is enabled to receive the wireless power, transmit the second wireless power to the fourth coil at one of the first surface and the second surface based on the first proximity sensor and the second proximity sensor,
wherein receiving or transmitting the second wireless power is simultaneous with receiving or transmitting the first wireless power.

5. The power storage adapter of claim 1, further comprising instructions to:
receive a request for a third power delivery contract from a third electronic device coupled to the power storage adapter at the PSA port, the third power delivery contract to supply a third electrical power to the third electronic device; and
responsive to receiving the request, establish the third power delivery contract, wherein supplying the third wireless power is simultaneous with receiving or transmitting the first wireless power.

6. The power storage adapter of claim 1, further comprising instructions to, when the first electronic device is enabled to receive the wireless power, supply the first wireless power from the PSA battery.

7. The power storage adapter of claim 1, further comprising instructions to, when the first electronic device is enabled to receive the wireless power, supply the first wireless power from an AC line power source coupled to the power storage adapter using an AC-DC converter.

8. The power storage adapter of claim 1, further comprising instructions to, when the first electronic device is enabled to transmit the wireless power, charge the PSA battery using the first wireless power.

9. The power storage adapter of claim 4, wherein the first electronic device is a portable information handling system and the second electronic device is one of a charging device and a portable information handling system.

10. A method, comprising:
detecting a first electronic device having a third coil at one of a first surface and a second surface of a housing of a power storage adapter using a first proximity sensor and a second proximity sensor of the power storage adapter, the power storage adapter including a first coil in proximity to the first surface and a second coil in proximity to the second surface, wherein the second surface opposite the first surface;
determining, using a communication device of the power storage adapter, whether the first electronic device is enabled to receive or transmit wireless power;
when the first electronic device is enabled to transmit the wireless power, receiving a first wireless power from the third coil at one of the first surface and the second surface based on the first proximity sensor and the second proximity sensor;
when the first electronic device is enabled to receive the wireless power, transmitting the first wireless power to the third coil at one of the first surface and the second surface based on the first proximity sensor and the second proximity sensor;
diverting, by a first magnetic shield of the power storage adapter, a first magnetic flux of the first coil away from the second coil;
generating, by the first magnetic shield of the power storage adapter, a first opposing magnetic flux to remove effects of the first magnetic flux on the second coil;

diverting, by a second magnetic shield of the power storage adapter, a second magnetic flux of the second coil away from the first coil; and generating, by the second magnetic shield of the power storage adapter, a second opposing magnetic flux to remove effects of the second magnetic flux on the first coil.

11. The method of claim 10, further comprising, when the first electronic device is detected at the first surface:

when the first electronic device is enabled to transmit the wireless power, configuring the first coil as a receive coil; and when the first electronic device is enabled to receive the wireless power, configuring the first coil as a transmit coil.

12. The method of claim 10, further comprising instructions to, when the first electronic device is detected at the second surface:

when the first electronic device is enabled to transmit the wireless power, configuring the second coil as a receive coil; and when the first electronic device is enabled to receive the wireless power, configuring the second coil as a transmit coil.

13. The method of claim 10, further comprising instructions to:

detecting a second electronic device having a fourth coil at one of the first surface and the second surface using the first proximity sensor and the second proximity sensor, wherein the second electronic device and the first electronic device are detected at different surfaces;

determining, using the communication device, whether the second electronic device is enabled to receive or transmit wireless power;

when the second electronic device is enabled to transmit the wireless power, receiving a second wireless power from the fourth coil at one of the first surface and the second surface based on the first proximity sensor and the second proximity sensor; and when the second electronic device is enabled to receive the wireless power, transmitting the second wireless power to the fourth coil at one of the first surface and the second surface based on the first proximity sensor and the second proximity sensor, wherein receiving or transmitting the second wireless power is simultaneous with receiving or transmitting the first wireless power.

14. The method of claim 10, further comprising instructions to:

receiving a request for a third power delivery contract from a third electronic device coupled to the power storage adapter at the PSA port, the third power delivery contract to supply a third electrical power to the third electronic device; and responsive to receiving the request, establishing the third power delivery contract, wherein supplying the third wireless power is simultaneous with receiving or transmitting the first wireless power.

15. The method of claim 10, further comprising instructions to, when the first electronic device is enabled to receive the wireless power, supplying the first wireless power from the PSA battery.

16. The method of claim 10, further comprising instructions to, when the first electronic device is enabled to receive the wireless power, supplying the first wireless power from an AC line power source coupled to the power storage adapter using an AC-DC converter.

17. The method of claim 10, further comprising instructions to, when the first electronic device is enabled to transmit the wireless power, charging the PSA battery using the first wireless power.

18. The method of claim 13, wherein the first electronic device is a portable information handling system and the second electronic device is one of a charging device and a portable information handling system.

* * * * *